United States Patent
Bauer

(10) Patent No.: US 7,823,807 B1
(45) Date of Patent: Nov. 2, 2010

(54) LIQUID MANURE APPLICATOR, METHOD, AND TOOL WITH BELLOWS TYPE DOWNFORCE SYSTEM

(75) Inventor: Mark A. Bauer, Faribault, MN (US)

(73) Assignee: Environmental Tillage Systems, Inc., Faribault, MN (US)

( * ) Notice: Subject to any disclaimer, the term of this patent is extended or adjusted under 35 U.S.C. 154(b) by 532 days.

(21) Appl. No.: 11/825,507

(22) Filed: Jul. 6, 2007

Related U.S. Application Data

(60) Provisional application No. 60/818,887, filed on Jul. 6, 2006.

(51) Int. Cl.
  *B05B 1/20* (2006.01)
  *A01G 25/09* (2006.01)
  *F23D 11/04* (2006.01)
  *A01C 23/00* (2006.01)
  *A01C 17/00* (2006.01)

(52) U.S. Cl. .................. 239/688; 239/159; 239/172; 239/214.15; 239/662; 239/681; 239/687

(58) Field of Classification Search ................ 239/159, 239/175, 214.15, 662, 166, 169, 172, 681, 239/687, 688, 689
See application file for complete search history.

(56) References Cited

U.S. PATENT DOCUMENTS

| | | | | |
|---|---|---|---|---|
| 4,232,616 A | * | 11/1980 | van der Lely | 111/121 |
| 5,271,567 A | * | 12/1993 | Bauer | 239/662 |
| 5,272,992 A | * | 12/1993 | Barbour et al. | 111/120 |
| 5,435,493 A | * | 7/1995 | Houle | 239/662 |
| 5,460,483 A | * | 10/1995 | Dorsch | 415/121.1 |
| 5,772,082 A | * | 6/1998 | Depault | 222/383.2 |
| 6,202,942 B1 | * | 3/2001 | Hultgreen et al. | 239/214.15 |

* cited by examiner

*Primary Examiner*—Len Tran
*Assistant Examiner*—Ryan Reis
(74) *Attorney, Agent, or Firm*—James W. Miller

(57) ABSTRACT

A liquid manure applicator comprises a tank for holding a supply of liquid manure that is distributed onto a farm field through a distributor having a plurality of distribution ports and hoses. The hoses lead to individual distribution tools that include a pair or rotary coulters and a bellows for applying downforce to the coulters. The distributor includes a ring that restricts the size of the solids entering the distribution ports and hoses to something substantially equal to or less than 50% of the cross-sectional area of the hoses. This prevents the hoses from plugging even when small diameter hoses are used to lower the application rates to values more consistent with the needs of a zone tilled field. A rotary chopper in the distributor reduces the size of larger solids until they have been broken up into pieces small enough to pass the restriction provided by the ring.

20 Claims, 18 Drawing Sheets

LIQUID MANURE APPLICATOR, METHOD, AND TOOL WITH BELLOWS TYPE DOWNFORCE SYSTEM

CROSS REFERENCE TO RELATED APPLICATIONS

This application claims the benefit of one or more previously filed copending provisional applications identified as follows: Application Ser. No. 60/818,887 filed Jul. 6, 2006.

TECHNICAL FIELD

This invention relates generally to a farming practice involving the application of liquid manure to a farm field to fertilize the field using the manure. More particularly, this invention relates to a new method and applicator for applying liquid manure to farm fields that have been tilled using zone tillage. In addition, this invention relates to a tool and a system for applying downforce on the tool used either as part of the manure applicator or for zone tillage.

BACKGROUND OF THE INVENTION

Zone tillage is an environmentally friendly farming practice used in conjunction with the planting and growing of row crops, such as corn and soybeans. In zone tillage, only narrow strips or zones corresponding to the location of the crop rows that will be planted are tilled and fertilized. The rest of the field between the zones is left untilled. The vegetation in the untilled areas between the zones acts, among other things, as an anchor for the soil, thereby preventing soil loss through erosion and the like.

The Applicant herein has invented a new method and tool for zone tillage which is disclosed in U.S. Publication No. 2006/0065412 published Mar. 30, 2006 and entitled ZONE TILLAGE TOOL AND METHOD. This published patent application is hereby incorporated by reference. The reader of this application is referred to this published patent application for more information and details on the practice of zone tillage and for a description of one tool and method that can be employed in this practice.

It is well known that animal waste, such as liquid manure, can be used as fertilizer. Many animal raising operations, such as large scale, modern hog farms and the like, have large numbers of animals that generate significant amounts of waste. This waste is allowed to drop down into collection pits that underlie the areas where such animals are confined. This waste comprises a combination of urine, manure and possibly some water and is a liquid with some solids suspended therein. The term liquid manure refers to this combination of waste and other substances, mostly liquid but containing some solids, that collect in such collection pits beneath animal confinement areas.

The liquid manure is pumped out of the collection pits into tanks or wagons. The tanks or wagons are then used to spread or apply the liquid manure to farm fields to fertilize the fields. Sometimes, the liquid manure is first pumped from the collection pits to holding ponds or holding tanks which store the liquid manure before it is used on the farm fields. However, in either case, namely whether the liquid manure is taken directly from the collection pits to the fields or is first temporarily held in a holding pond or tank, the ultimate objective is to use the liquid manure as fertilizer by applying it in some fashion to the farm fields.

There are various economic and environmental advantages to the farmer of using liquid manure as fertilizer. First, the cost of alternative chemical or petrochemical based fertilizers is very high and adds to the cost of raising the crop to which the fertilizer is applied. Liquid manure is often free to the farmer since it is generated by the farmer's own animals. Even if the farmer does not own any animals but obtains liquid manure from one who does, liquid manure is far less costly to obtain than alternative fertilizers. Thus, using liquid manure as fertilizer saves the farmer money and decreases the costs of producing the crop, thus increasing the farmer's profit, always a desirable goal.

Secondly, for a farmer who owns animals that generate large amounts of liquid manure, the farmer must find a way to dispose of the liquid manure. It cannot be allowed to build up indefinitely. Using the liquid manure as fertilizer allows the liquid manure to be recycled into the soil. The farmer does not have to haul the liquid manure to a sewage or waste treatment facility or find some other way to dispose of it. Thus, the liquid manure does not become a burden on public waste treatment facilities but is simply effectively reused in the production of crops.

Unfortunately, applying liquid manure to farm fields can be a difficult thing to do. This arises at least partly from the suspension of various solids or semi-solid materials in the liquid manure. These solids can comprise many things. For example, in the collection pits beneath the animal confinements areas, it is not uncommon to find the carcasses or carcass pieces of small animals that have died, twine or string, plastic containers such as pill bottles, etc. In the holding ponds that contain liquid manure, various plants can grow which add vegetative debris to the liquid manure, such as plant stalks, root balls, etc.

Attempts have been made to filter the liquid manure before it is applied in an attempt to remove the suspended solids. Many known manure distribution applicators have filter screens through which the liquid manure passes. However, such filters are not completely effective in removing the suspended solids. Some solids will compress enough to pass through the holes in the filter screen. Other solids may be shaped in such a way that they are narrow enough to pass through the holes in the filter screen but are relatively long, such as pieces of bone or long stalks of plant material. Thus, even after filtering, liquid material still contains various suspended solids of various sizes.

As a consequence of the suspension of such solids in the liquid manure, liquid manure can be pumped and distributed onto a farm field only through relatively large distribution hoses. Typically, such distribution hoses have needed a minimum diameter of 3" to 4". Such a large minimum diameter is needed to allow the solids that are still suspended in the liquid manure to pass through without plugging the hoses. Even so, the occasional suspended solid will still be larger than the diameter of the hose and will plug the hose when forced into the hose. This means that the farmer has to remove the plug. This is a dirty, time consuming and inconvenient task.

The use of relatively large diameter distribution hoses means that liquid manure is applied to farm fields at relatively high rates. Such large hoses mean that large amounts of liquid manure will be pumped through the hoses and reach a certain area of ground as the distribution vehicle moves over the field. This is a waste of liquid manure as it need not be applied to the field in such large quantities, particularly when one considers zone tillage. The only parts of the field that have to be fertilized in a field that has been zone tilled are the small narrow strips or zones in which the row crops will grow. Pumping liquid manure onto such zones through 4" diameter hoses is a gross over application of liquid manure.

Thus, there is a need in the art for a more effective and efficient application of liquid manure to a farm field, particularly to a field that has been zone tilled. It would be desirable to be able to apply the liquid manure at far lower rates than those possible in the past to the zones in a zone tilled farm field.

SUMMARY OF THE INVENTION

One aspect of this invention relates to a liquid manure applicator. The applicator comprises a tank for holding a supply of liquid manure. A distributor has a plurality of distribution ports. The distributor is operatively coupled to the tank to receive liquid manure therefrom. A plurality of hoses are operatively connected to the distribution ports of the distributor with the hoses leading away from the distributor. A plurality of distribution tools support outlet ends of the hoses above a plurality of zones in a farm field to apply liquid manure to the zones as the tools are moved over the zones. A plurality of restriction flanges are located within the distributor with the restriction flanges passing across entrances to the distribution ports to restrict or limit the size of any solids suspended in the liquid manure that can enter the distribution ports.

Another aspect of this invention relates to a method for applying liquid manure to a farm field that has a plurality of laterally spaced, parallel zones in which crops will be planted. The method comprises providing a supply of liquid manure which includes suspended solids therein, pumping the liquid manure to and through a distributor and through a plurality of distribution hoses that lead from the distributor, arranging outlet ends of the distributor hoses over the tilled zones such that the liquid manure is discharged atop the tilled zones, and restricting the size of the suspended solids that may pass from the distributor to the distribution hoses to a size that is substantially equal to or less than 50% of a cross-sectional area of the hoses.

Yet another aspect of this invention relates to a tool used in zone tillage farming in which a plurality of laterally spaced, parallel zones are provided in which row crops are planted. The tool comprises a tool frame. A pivotal arm is connected to the tool frame for pivoting about a first pivot axis. The arm carries at least one rotatable ground engaging member for rolling on the ground with the arm pivoting upwardly and downwardly in response to changes in ground contour. A device is mounted on the arm for performing an agricultural operation in one of the zones in the farm field. An expandable bellows puts a downforce on the arm that increases or decreases as air pressure inside the bellows is increased or decreased. The bellows is sandwiched and constrained between a pair of support surfaces with a first support surface being fixed to the arm and a second support surface being pivotal relative to the tool frame to be able to pivot with respect to the arm. A linkage operatively connects the second support surface to the arm such that pivoting motion of the arm also pivots the second support surface such that the second support surface remains substantially parallel to the first support surface to avoid uneven motion of opposite sides of the bellows as the arm pivots on the tool frame to follow ground contours.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
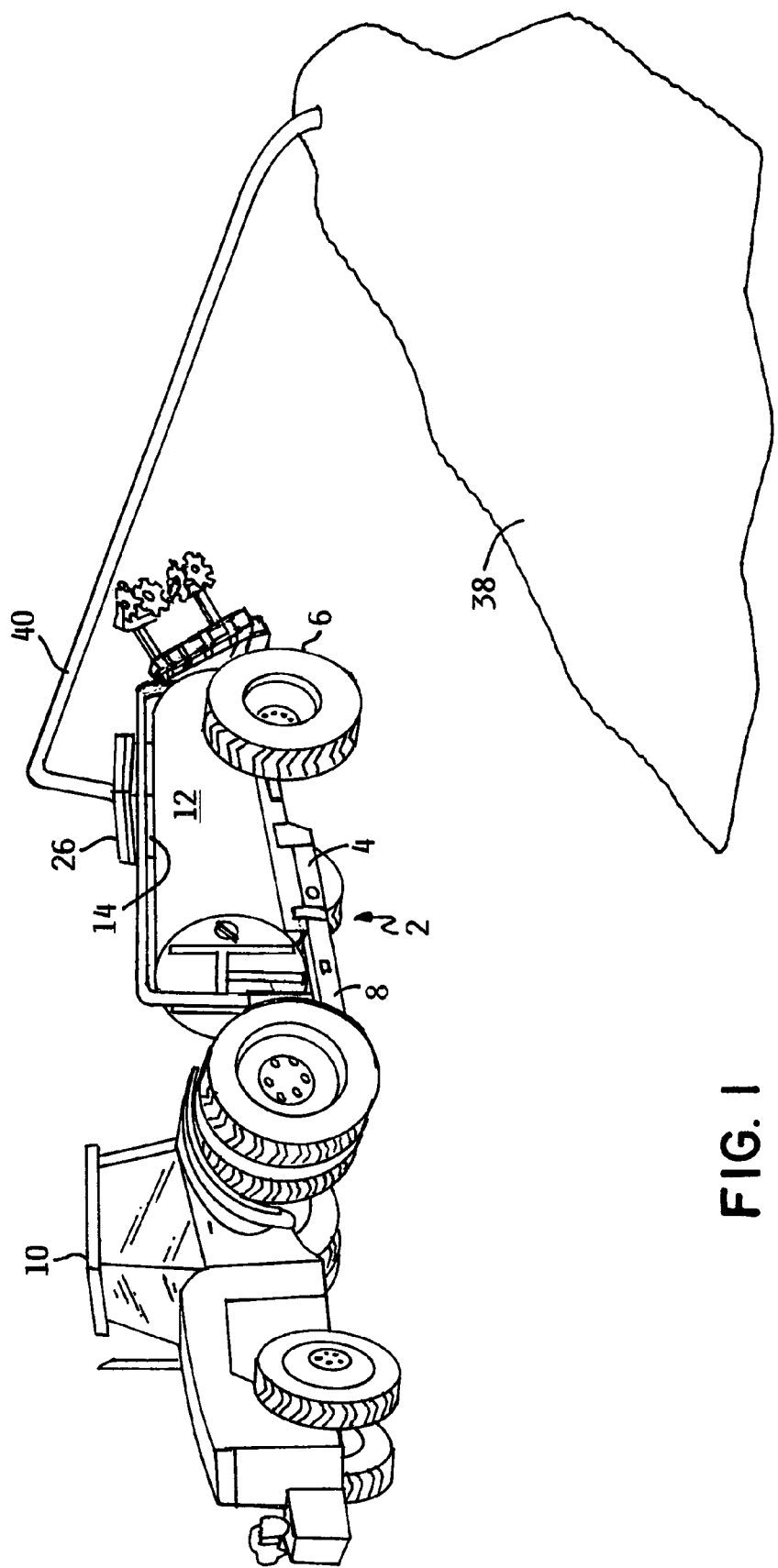
FIG. 1 is a perspective view of a manure applicator according to this invention, particularly illustrating the applicator as a tow behind trailer connected to a tractor with the tank on the trailer in the process of being filled with liquid manure from a liquid manure holding pond.

One embodiment of a liquid manure applicator according to this invention is generally illustrated as 2 in FIG. 1. Applicator 2 comprises a towed trailer 4 having a pair of rear ground engaging wheels 6. Trailer 4 includes a hitch 8 for coupling trailer 4 to a towing vehicle 10, such as a tractor. While applicator 2 is preferably in the form of a towed trailer 4, this need not necessarily be the case. Applicator 2 could also comprise a self-propelled vehicle.

The Tank and Inlet

Figure 2:
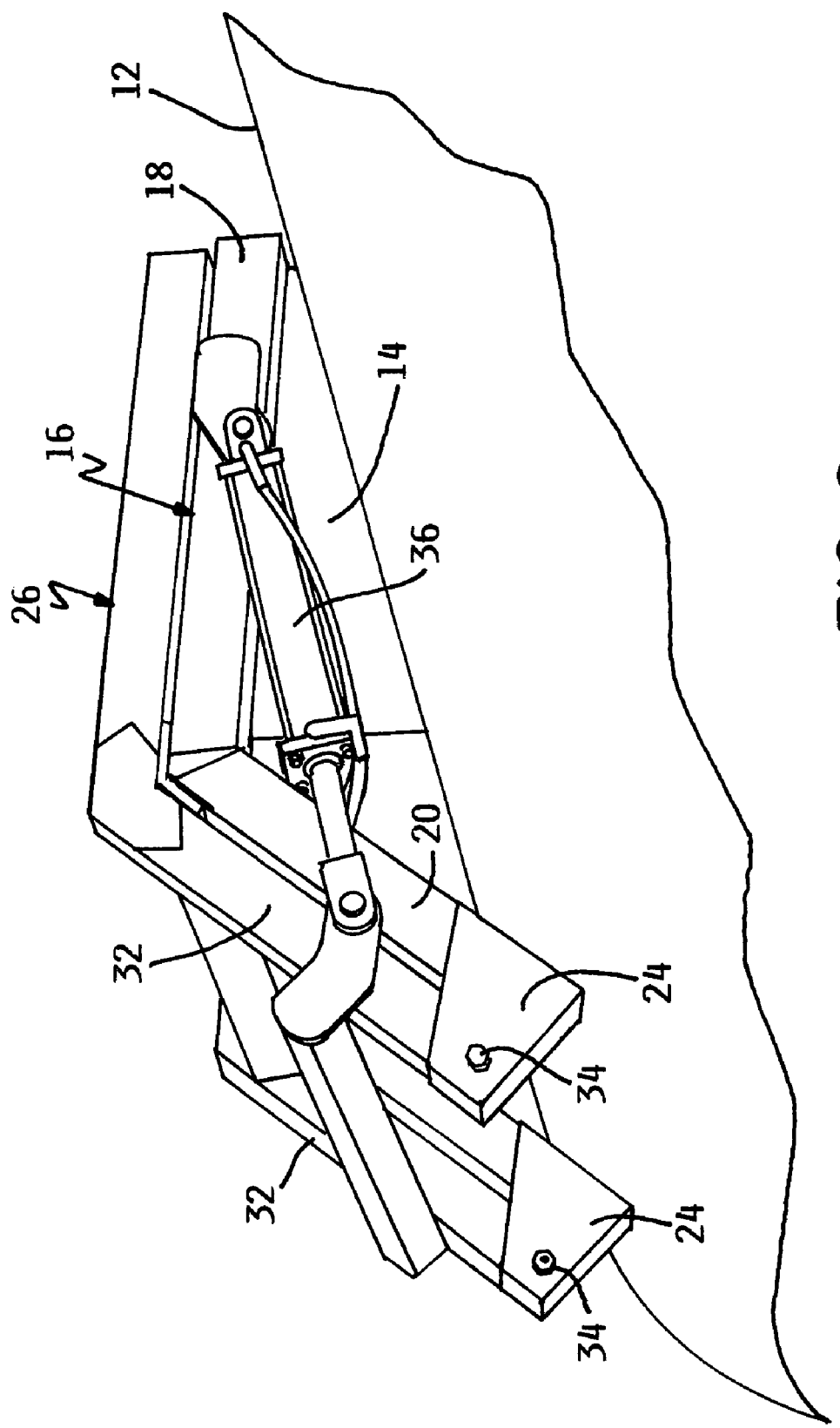
FIG. 2 is an enlarged perspective view of a portion of the trailer of FIG. 1, particularly illustrating the inlet to the tank on the trailer with a basket filter being fully inserted into the inlet in order to screen the liquid manure being pumped into the tank.
Figure 3:
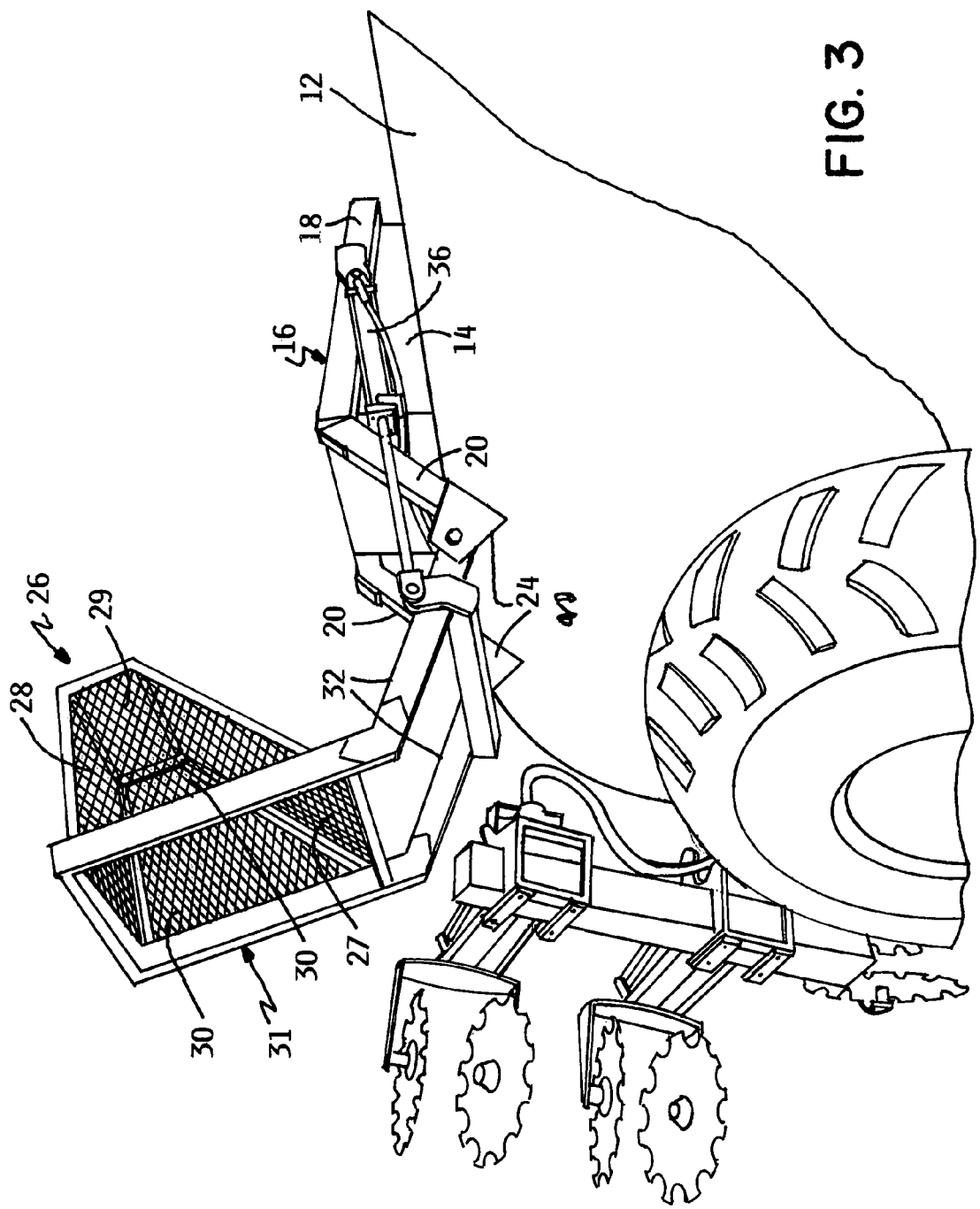
FIG. 3 is an enlarged perspective view similar to FIG. 2, but showing the basket filter having been pivoted out of the inlet to a dump position in which the solids that have been filtered out of the liquid manure may be dumped onto the ground or into a receptacle.

Applicator 2 includes a liquid manure storage tank 12 that extends substantially the full length of trailer 4. Referring to FIGS. 2 and 3, tank 12 includes an inlet 14 on a top wall of tank 12. Inlet 14 has an open, upwardly facing mouth 16 bounded by various beams 18. A pair of inclined supports 20 extend downwardly from beams 18 with each support 20 terminating in an upwardly extending foot 24 that abuts against the upper side of tank 12. Inlet 14 along with its open mouth 16 communicates to the interior of tank 12 and represents the structure by which tank 12 is filled with liquid manure.

The Basket Filter

A basket filter 26 is selectively inserted into mouth 16 of inlet 14. When filter 26 is in use to filter liquid manure entering inlet 14, filter 26 is substantially fully nested down inside inlet 14. As shown in FIG. 3, filter 26 is shaped somewhat like a French fry basket with a three-dimensional configuration including a front wall 27, a rear wall 28, a bottom wall 29, and a pair of trapezoidal side walls 30. This increases the volumetric filtering capacity of filter 26. The top of basket filter 26 comprises an open mouth 31 that is slightly smaller than the open mouth of inlet 14 to allow filter 26 to nest down within inlet 14.

Filter 26 includes a pair of side legs 32 that mount filter 26 to feet 24 of inclined supports 20 on inlet 14. A pair of pivot pins 34 pivotally attach side legs 32 to feet 24. Thus, filter 26 can be pivoted relative to tank 12, and relative to inlet 14, about the aligned axes of pivot pins 34. A hydraulic cylinder 36 is pivotally attached to inlet 14 and to one side leg 32 for pivoting filter 26.

As shown in FIG. 2, when the piston rod of cylinder 36 is retracted, filter 26 is pivoted into an operative, filtering position in which filter 26 is inserted in inlet 14. As shown in FIG. 3, when the piston rod of cylinder 36 is extended, filter 26 is pivoted into a non-operative, dumping position. In the dumping position, filter 26 is pivoted to the side of tank 12 and is sufficiently inverted so that any solids contained in basket filter 26 will simply slide out. These solids can then be caught in some type of receptacle or allowed to fall out onto the ground.

The use of a basket filter 26 that can be selectively moved from an operative, filtering position to a non-operative dumping position is advantageous. The operator need not climb up onto tank 12 and attempt to clean filter 26 by hand as is often the case with filters on conventional prior art manure applicators. Now, the operator need only actuate cylinder 36 to cause filter 26 to pivot up and out of inlet 14 into its dumping position. The contents of filter 26 will simply largely slide out of filter 26. In addition, if need be, the operator can hose filter 26 off while it is in the dumping position. All this can be done conveniently and safely from the ground.

When filter 26 is in place in inlet 14, applicator 2 is ready for being loaded with liquid manure. As shown in FIG. 1, this is done by moving applicator 2 adjacent a source 38 of liquid manure, such as the holding pond shown in FIG. 1. Liquid manure can then be pumped out of source 38 through a pipe 40. The discharge end of pipe 40 is simply positioned above inlet 14.

The liquid manure passing through pipe 40 will simply drop down through basket filter 26 and through inlet 14 to enter tank 12. Obviously, filter 26 will catch many of the larger pieces of suspended solids in the liquid manure and retain them in the basket shape of filter 26. However, smaller pieces of suspended solids and even some of the larger pieces of suspended solids will still make their way through filter 26. Thus, despite the presence of filter 26, at least some fairly large suspended solids will remain in the liquid manure contained in tank 12.

The walls 27-30 of basket filter 26 comprise a perforated screen material. The perforations may have sides as small as 1" in length, but the perforations may be larger with 2" sides. Generally speaking, if the perforations are too small, basket filter 26 will too easily become fouled and plugged. Thus, the perforations must be large enough to avoid frequent plugging of filter 26, but this leads invariably to the liquid manure suspension still containing various solids that are significantly larger than the size of the perforations.

The Pump and Transfer Pipe

Figure 4:
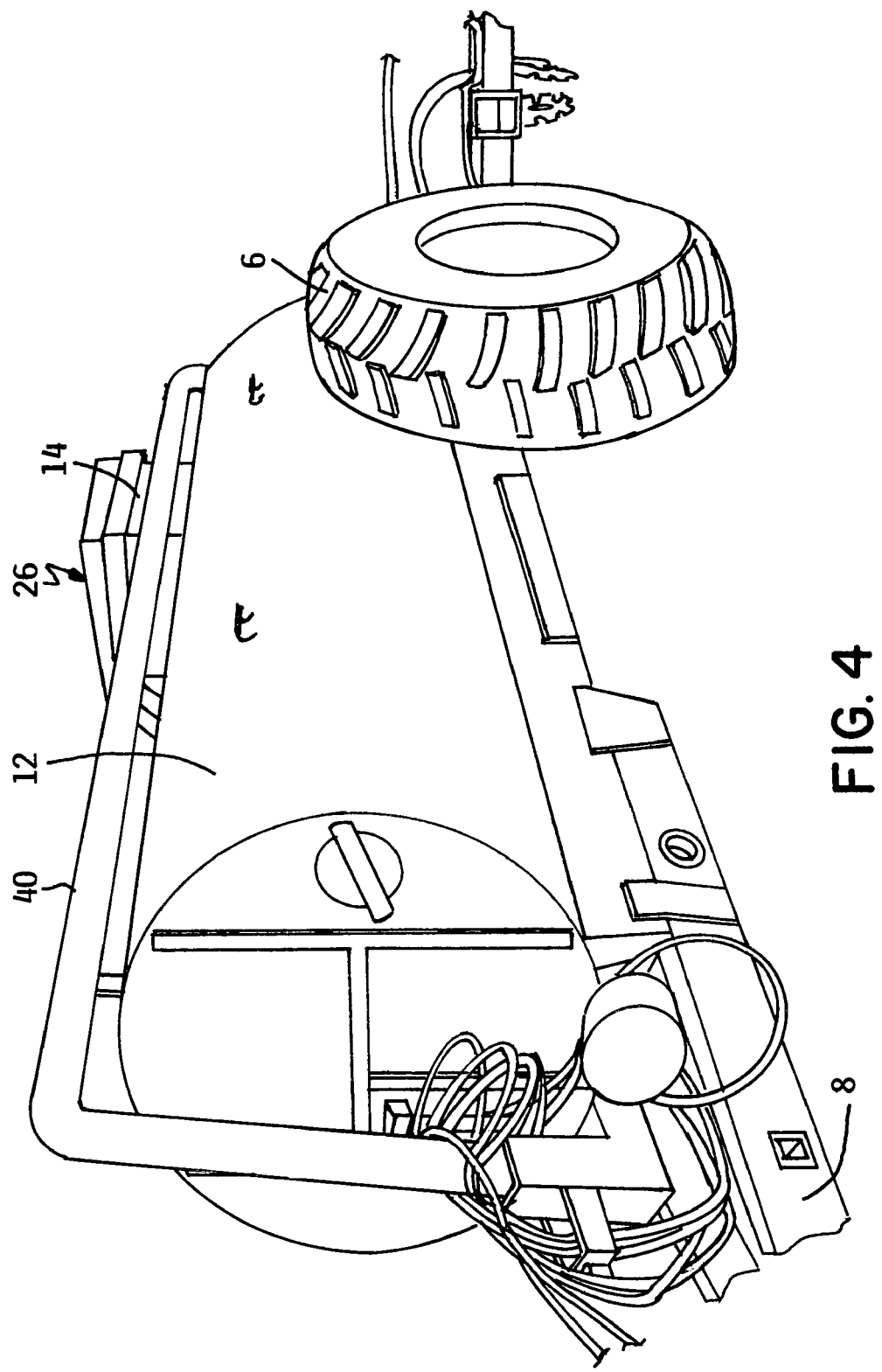
FIG. 4 is a front perspective view of the trailer of FIG. 1, particularly showing the transfer pipe on top of the tank through which liquid manure flows from an outlet at the front of the tank to the rear of the tank.
Figure 5:
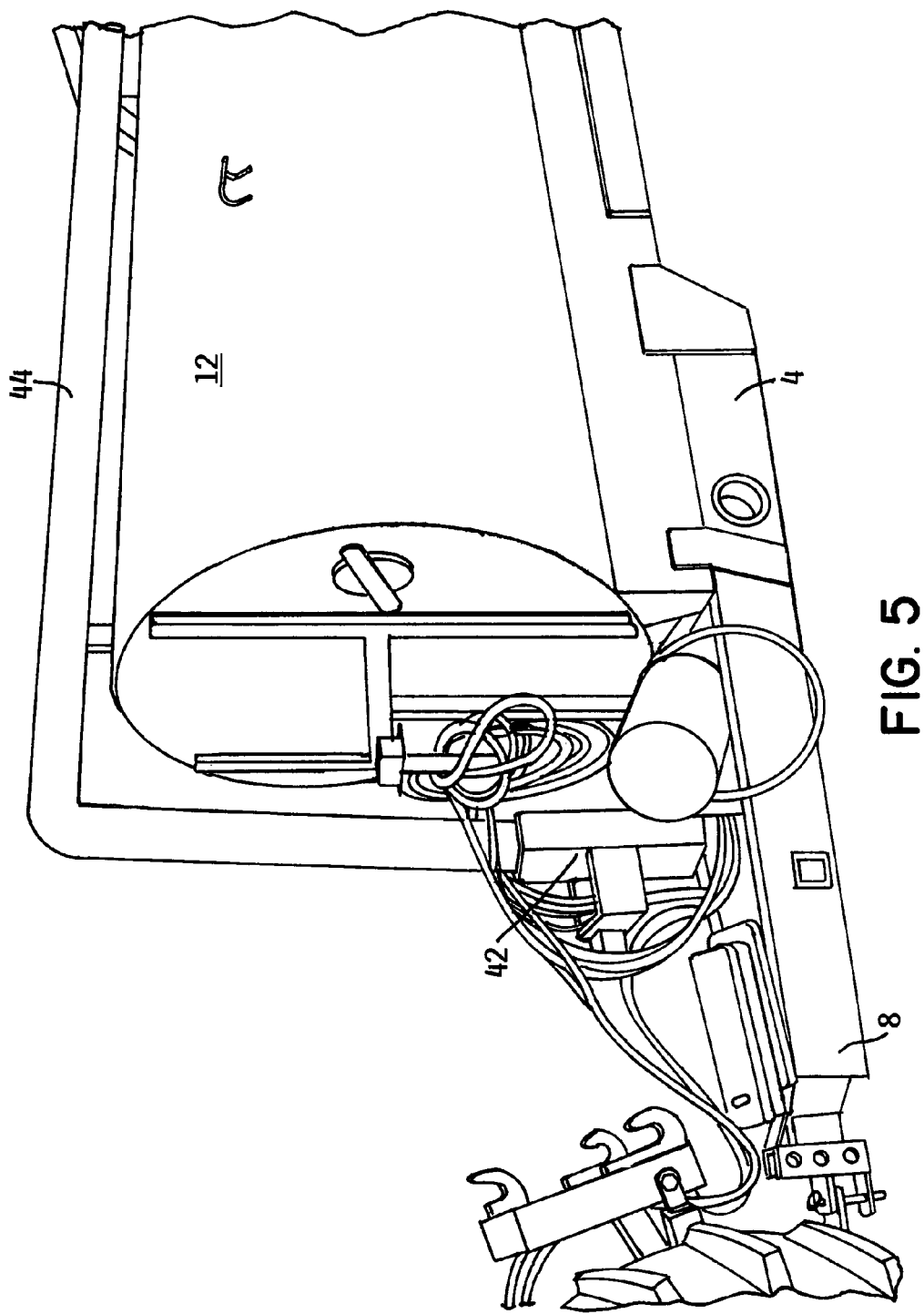
FIG. 5 is an enlarged perspective view of the front of the trailer of FIG. 1, particularly showing the pump on the front of the trailer which pumps liquid manure out of the tank through the transfer pipe.
Figure 6:
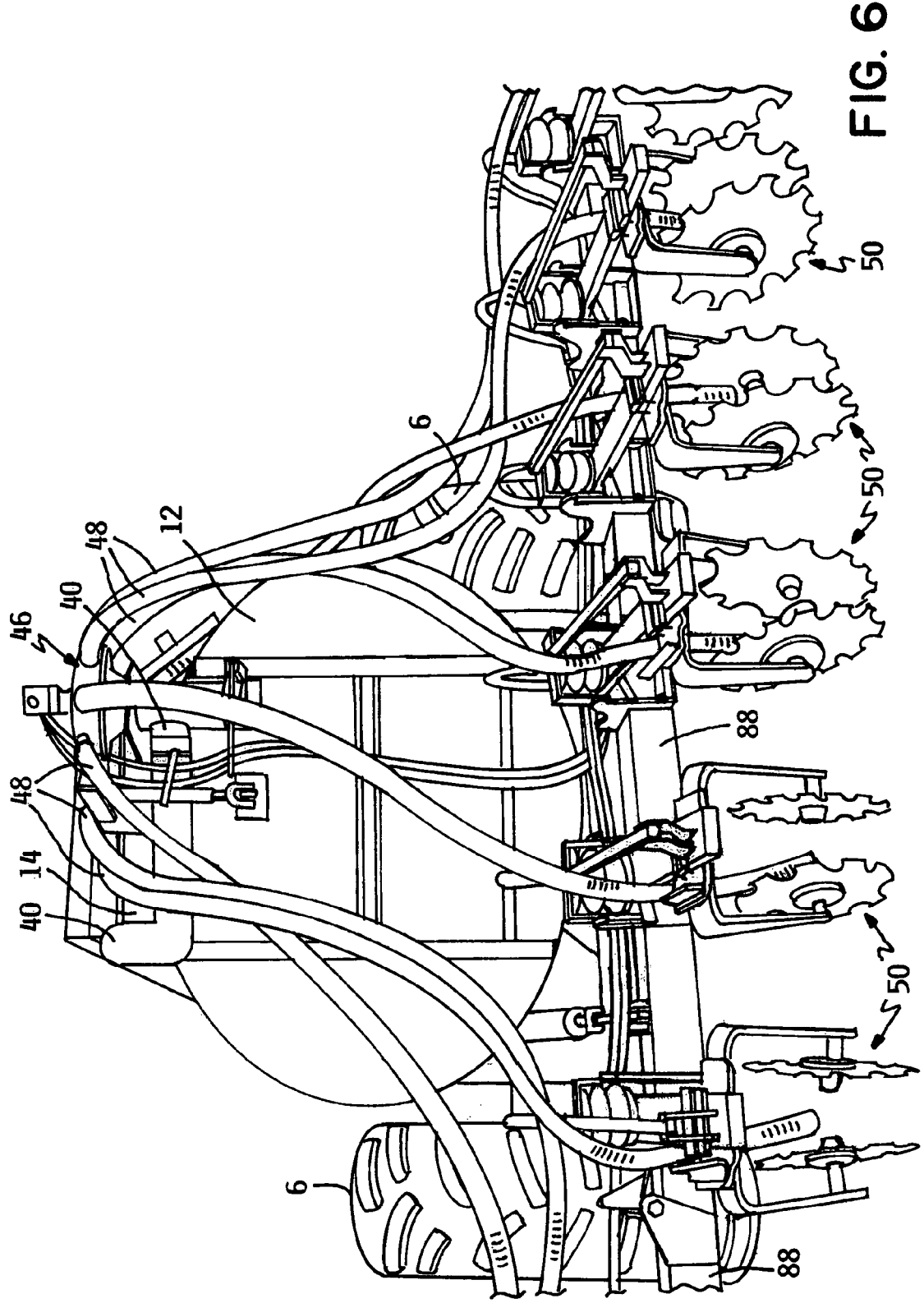
FIG. 6 is perspective view of the rear of the trailer of FIG. 1, particularly showing some of the manure distribution tools carried side-by-side on a tool bar at the rear of the trailer as well as the distribution hoses that carry liquid manure to the distribution tools from a distributor mounted at the rear of the trailer.
Figure 7:
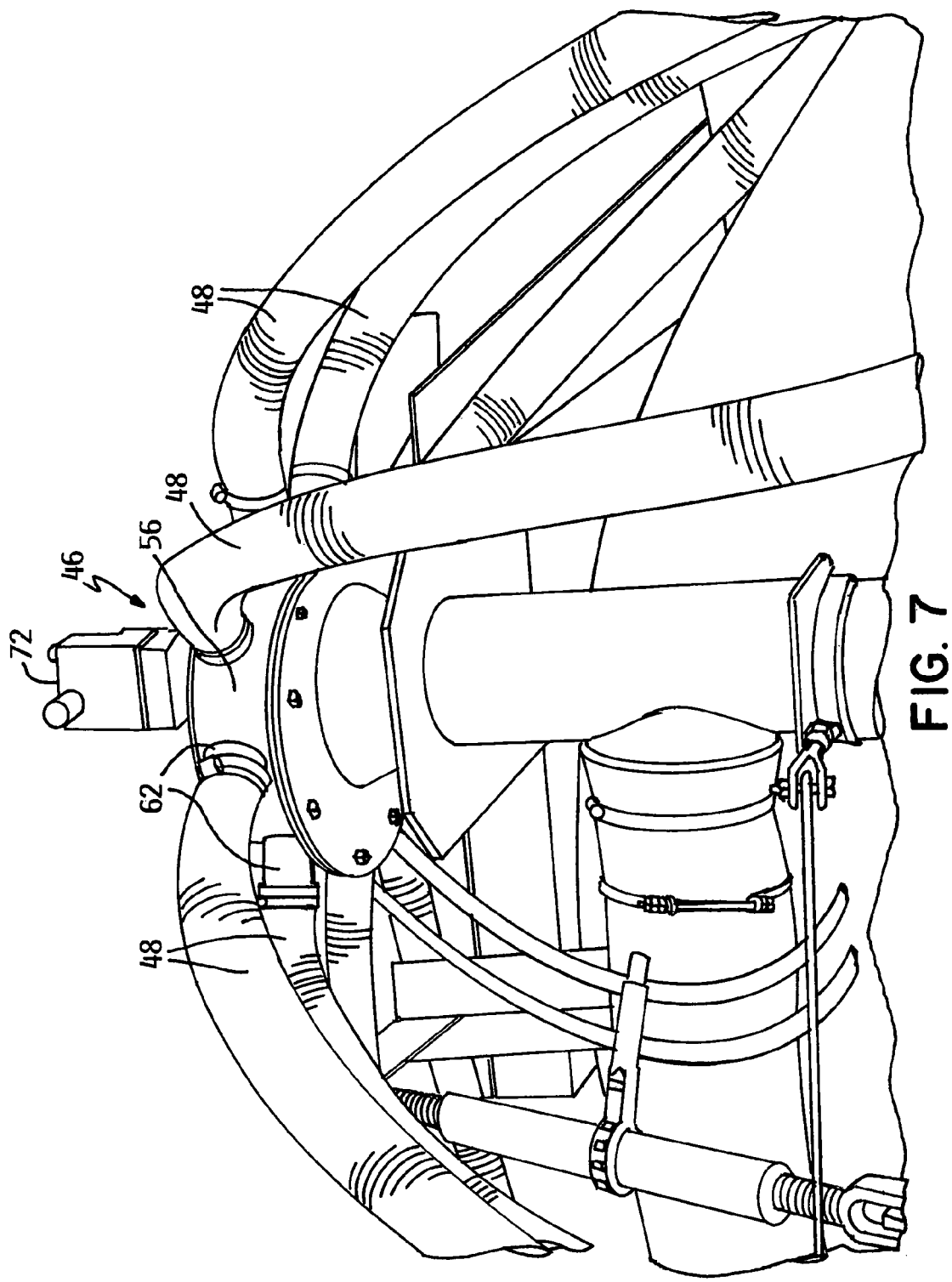
FIG. 7 is an enlarged perspective view of the distributor shown in FIG. 6, particularly showing some of the hoses leading from some of the distribution pipes on the distributor.

Referring now to FIGS. 4 and 5, a pump 42 is carried at the front of trailer 4 adjacent the front of tank 12 for pumping liquid manure out of tank 12. An adjustable gate valve is used to control or adjust the pumping capacity of pump 42. Pump 42 will pump the liquid manure through a relatively large diameter transfer pipe 44 (e.g. a 6" pipe) that runs from the front to the back of tank 12.

At the back of tank 12, transfer pipe 44 is coupled to the inlet of a liquid manure distributor 46. Transfer pipe 44 and distributor 46 are external of tank 12 with distributor 46 being mounted to the back of tank 12 towards the top of tank 12. Distribution hoses 48 connect distributor 46 to a plurality of liquid manure distribution tools 50. Tools 50 will be described later. For now, the description will turn to and focus on distributor 46.

The Distributor

Referring to FIGS. 11-18, distributor 46 has a bottom inlet 52 that connects to the rear or discharge end of transfer pipe 44. A funnel 54 connects inlet 52 to a generally cylindrical distributor housing 56 arranged above inlet 52. As pump 42 at the front of tank 12 operates, the liquid manure suspension will enter distributor 46 through inlet 52, will flow up through funnel 54, and will then enter housing 56 from the bottom of housing 56. The liquid manure suspension will exit housing 56 through a plurality of distribution ports 58 in the side wall 60 of housing 56.

Each port 58 feeds an external distribution pipe 62 to which the upper end of hose 48 is connected. See FIG. 5 which shows a plurality of hoses 48 connected to a plurality of external pipes 62 on housing 56 of distributor 46. The upper end of each hose 48 is simply clamped by a hose clamp or the like around the outer diameter of one pipe 62. Thus, as liquid manure passes through distributor 46, the liquid manure will be pumped out through all the ports 58, pipes 62 and hoses 48 to feed the individual tools 50.

Inside housing 56, there are three vertically spaced rings, namely a bottom ring $64_b$, a middle ring $64_m$, and a top ring $64_t$. Rings 64 are fixed to housing 56 in any suitable manner. For example, the outer diameter of each ring 64 is simply welded to the inner diameter of housing side wall 60. Rings 64 are relatively narrow between their inner and outer diameters. See FIG. 15. Thus, the circular interior, central area of each ring 64 inside the inner diameter of ring 64 represents an open central passageway through which the liquid manure can flow.

Figure 11:
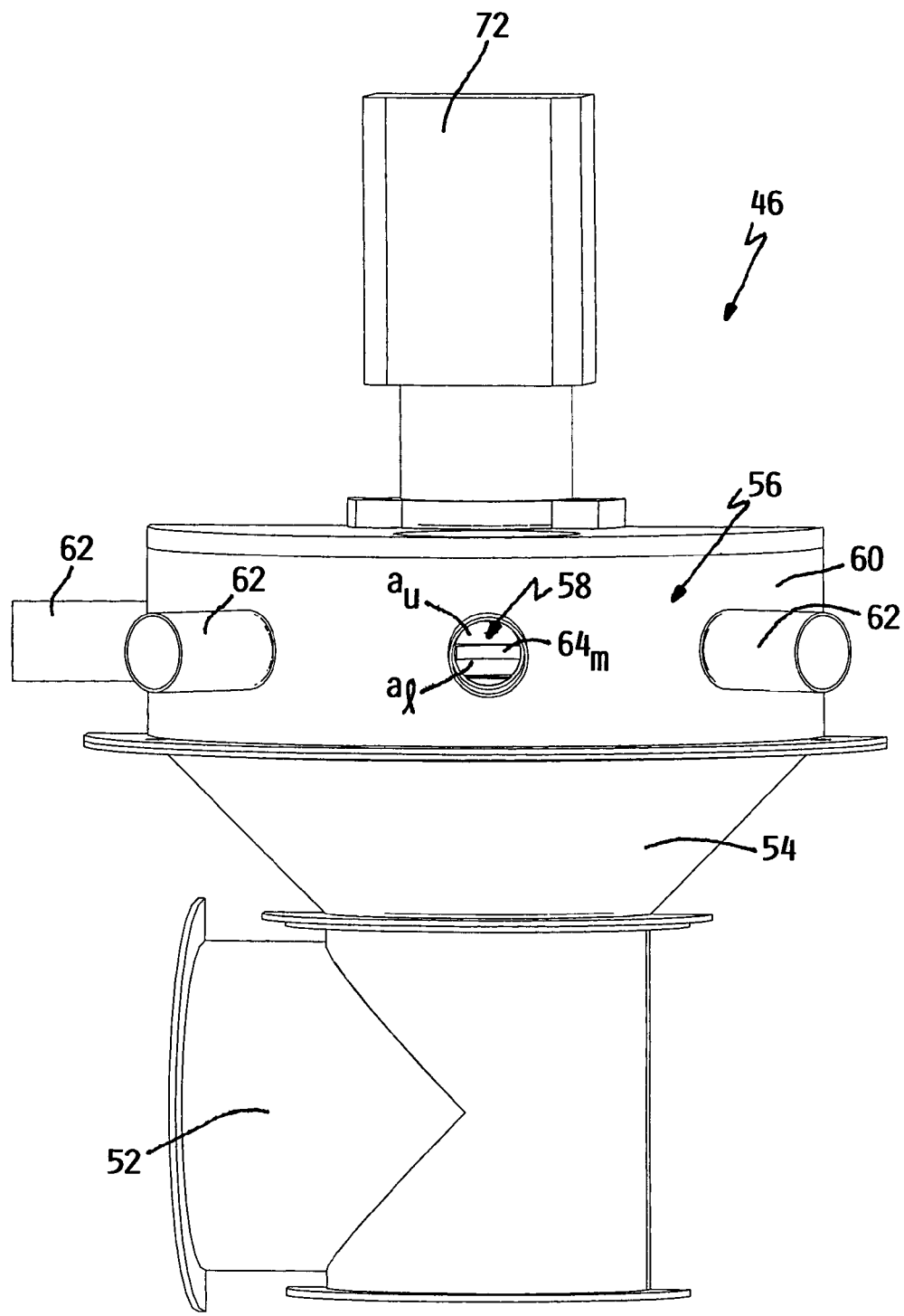
FIG. 11 is a side elevational view of one half of the distributor shown in FIGS. 5 and 6.
Figure 12:
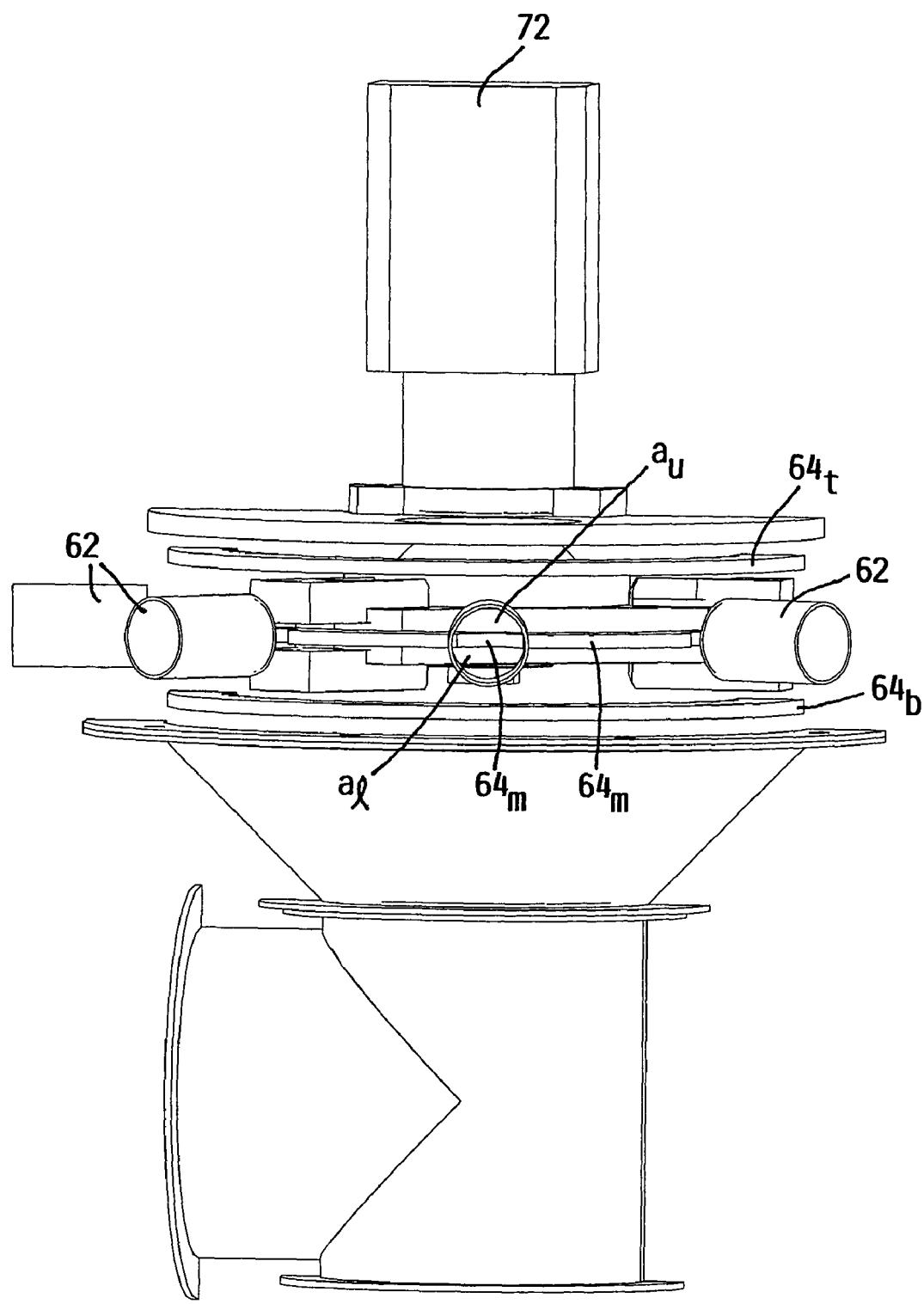
FIG. 12 is a side elevational view similar to FIG. 11 but with the side wall of the distributor removed for clarity, particularly illustrating three rings contained inside the distributor as well as a rotary chopper that cooperates with the rings to reduce the size of large solids in the liquid manure suspension.
Figure 13:
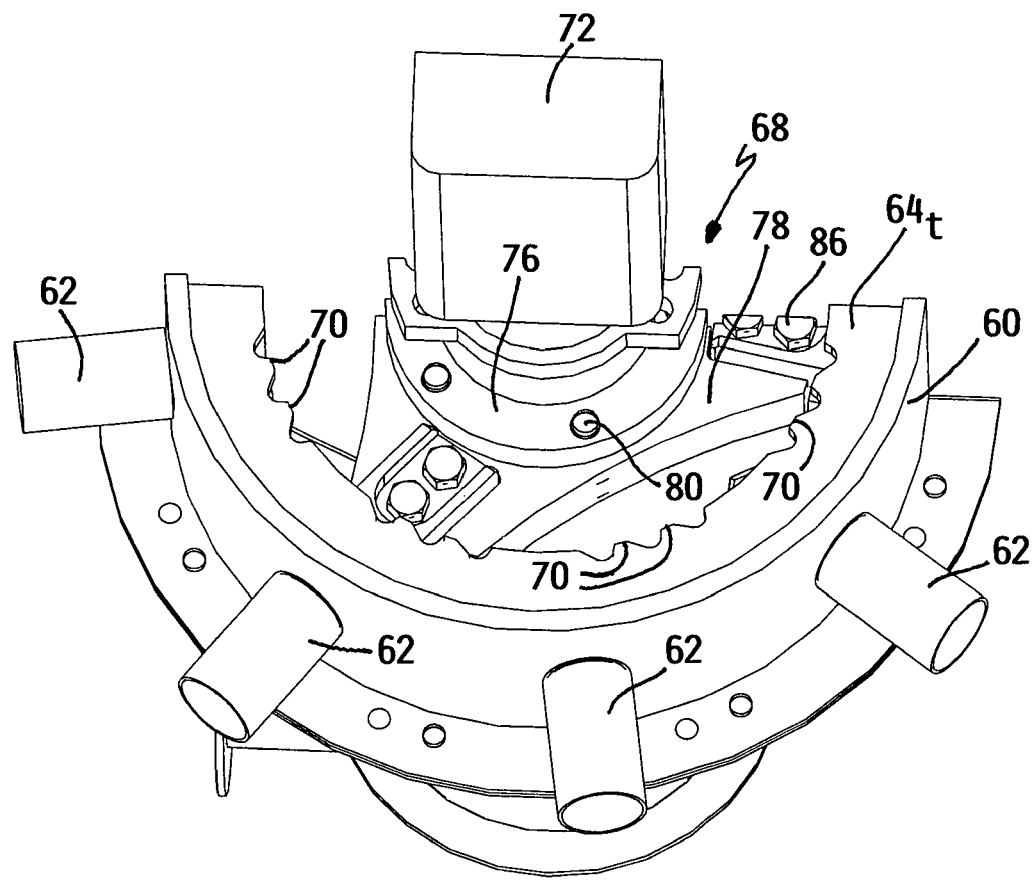
FIG. 13 is a top perspective view of the distributor of FIG. 11 but with the top wall of the distributor removed for clarity, particularly illustrating the top ring and the chopper.

Ports 58 in housing 56 are located at the same vertical height in housing 56 approximately at the middle of housing 56. Thus, ports 58 are carried in a circular array extending around the middle of housing 56. Middle ring $64_m$ is also located at the middle of housing 56 such that middle ring $64_m$ bisects the open area of each port 58. In other words, middle ring $64_m$ cuts each port 58 approximately in two with middle ring $64_m$ extending from side-to-side across the horizontal diameter of port 58. This is best shown in FIG. 11 which shows middle ring $64_m$ extending across the width of port 58 and a pipe 62 connected to such port, pipe 62 and port 58 having the same diameter. Thus, middle ring $64_m$ divides the cross-sectional area of port 58 into an open upper area and a similarly sized open lower area identified as $a_u$ and $a_l$, respectively, in FIG. 11.

The purpose of middle ring $64_m$ is to form a restriction at the entrance to each port 58 to limit the size of the solids which can flow into port 58. Obviously, the only solids that enter port 58 must do so by passing through either the open upper area $a_u$ or the open lower area $a_l$ of port 58. To do so, the solids must be substantially equal to or less than the open upper or lower areas $a_u$ and $a_l$. If the solids are larger, they will not be able to get past the restriction formed by middle ring $64_m$. Thus, such solids will continue to circulate around inside distributor 46 until they break or are broken apart into smaller sizes.

Accordingly, middle ring $64_m$ ensures that if any solids suspended in the liquid manure enter any ports 58, they will do so in sizes that are significantly smaller than the area of port 58 and the area of hoses 48. This practically eliminates the possibility of any plugging of hoses 48. Such small sized solids will simply flow through hoses 48 as the solids are small enough in relation to the cross-sectional area of a hose 48 to easily slip through hoses 48.

A plug free flow of liquid manure will generally occur if the size of the solids entering hoses 48 is no larger than approximately half the cross-sectional area of each hose 48. Of course, if middle ring $64_m$ bisects port 58 along the horizontal diameter of port 58 as shown in FIG. 11, the open upper area $a_u$ and the open lower area $a_l$ will actually be significantly less than 50%. This is due to the thickness of middle ring $64_m$ itself. Middle ring $64_m$ must be thick enough to comprise a rigid, fixed structural member and this thickness takes up some of the cross-sectional area of port 58. Thus, the open upper and lower areas $a_u$ and $a_l$ must inevitably be less than 50% with middle ring $64_m$ bisecting port 58.

Figure 14:
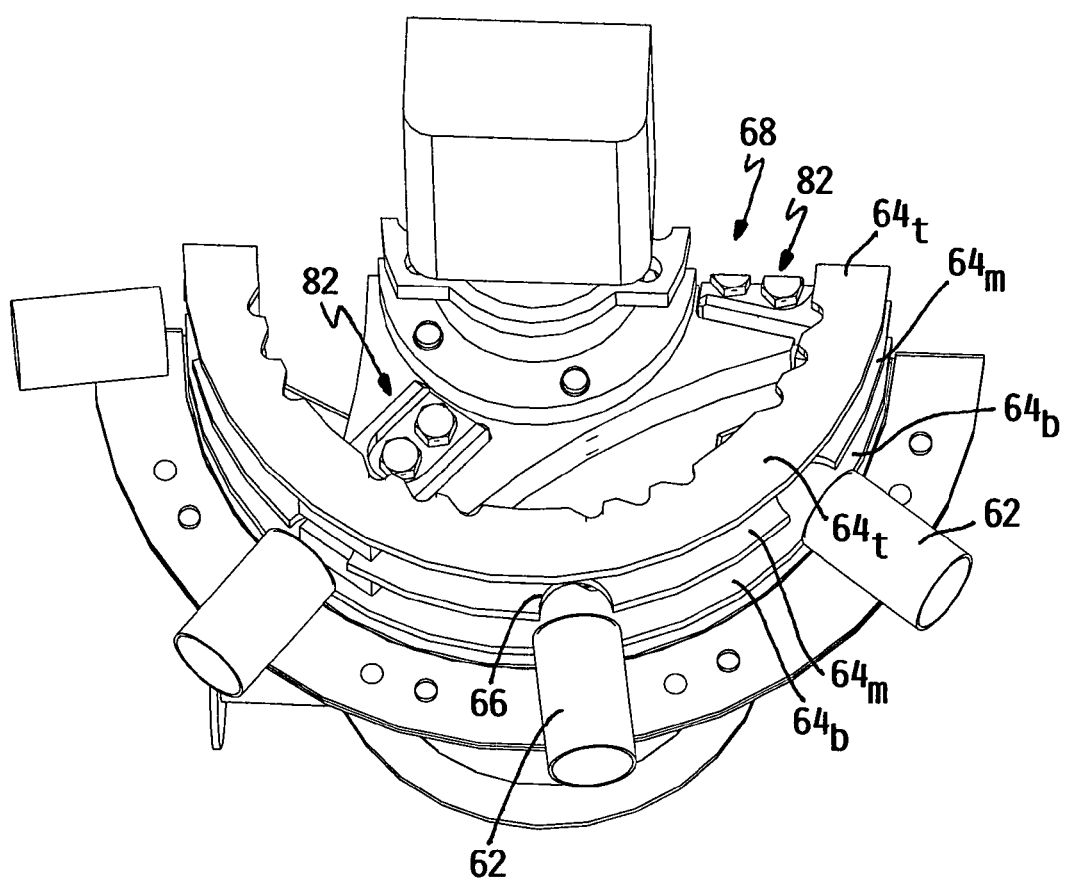
FIG. 14 is a top perspective view similar to FIG. 13 but with the side wall of the distributor further removed for clarity, particularly illustrating all three of the rings and the chopper.
Figure 15:
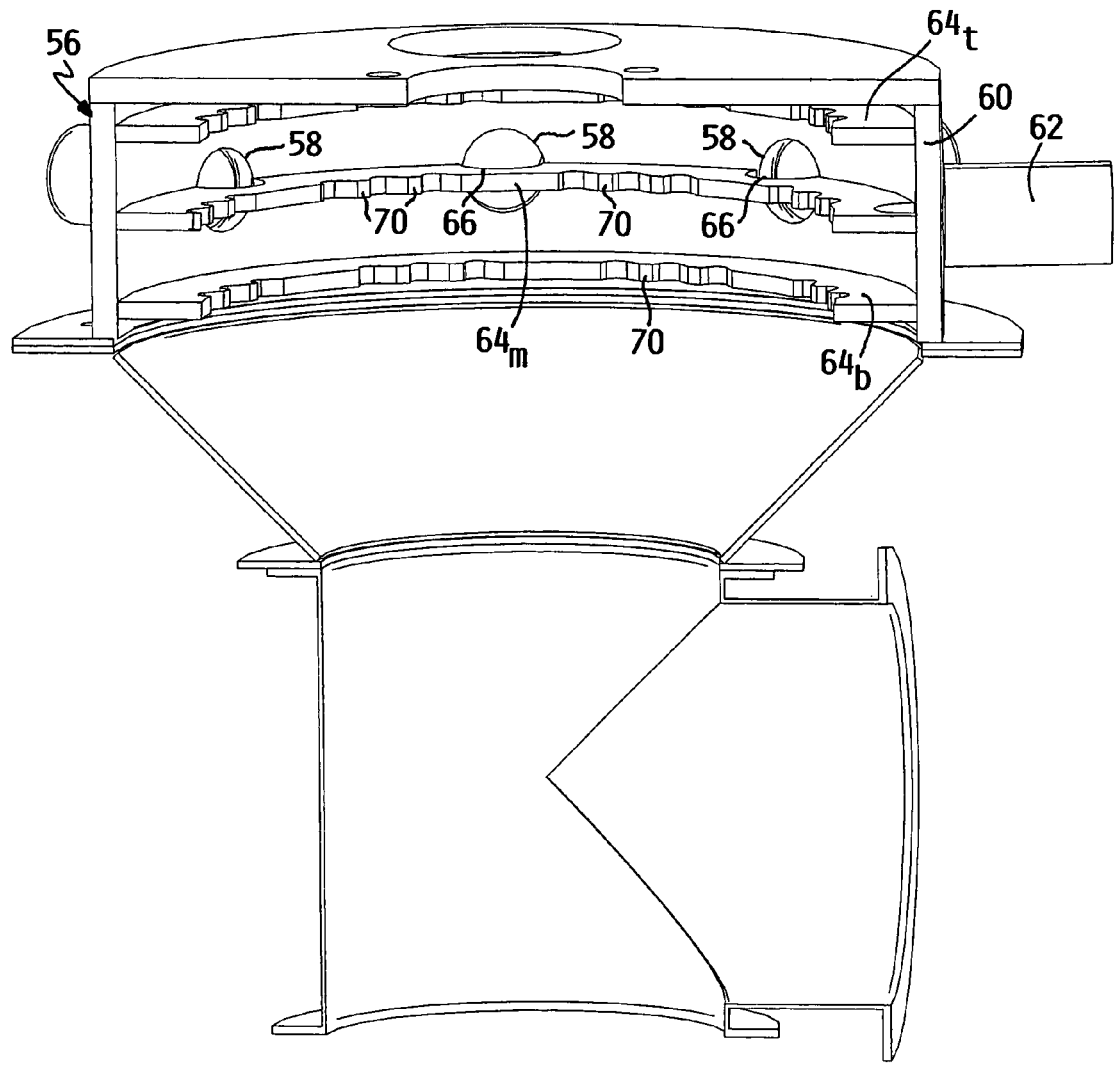
FIG. 15 is a vertical cross-sectional view through the distributor of FIG. 11 but with the chopper removed for clarity, particularly illustrating the three rings.
Figure 17:
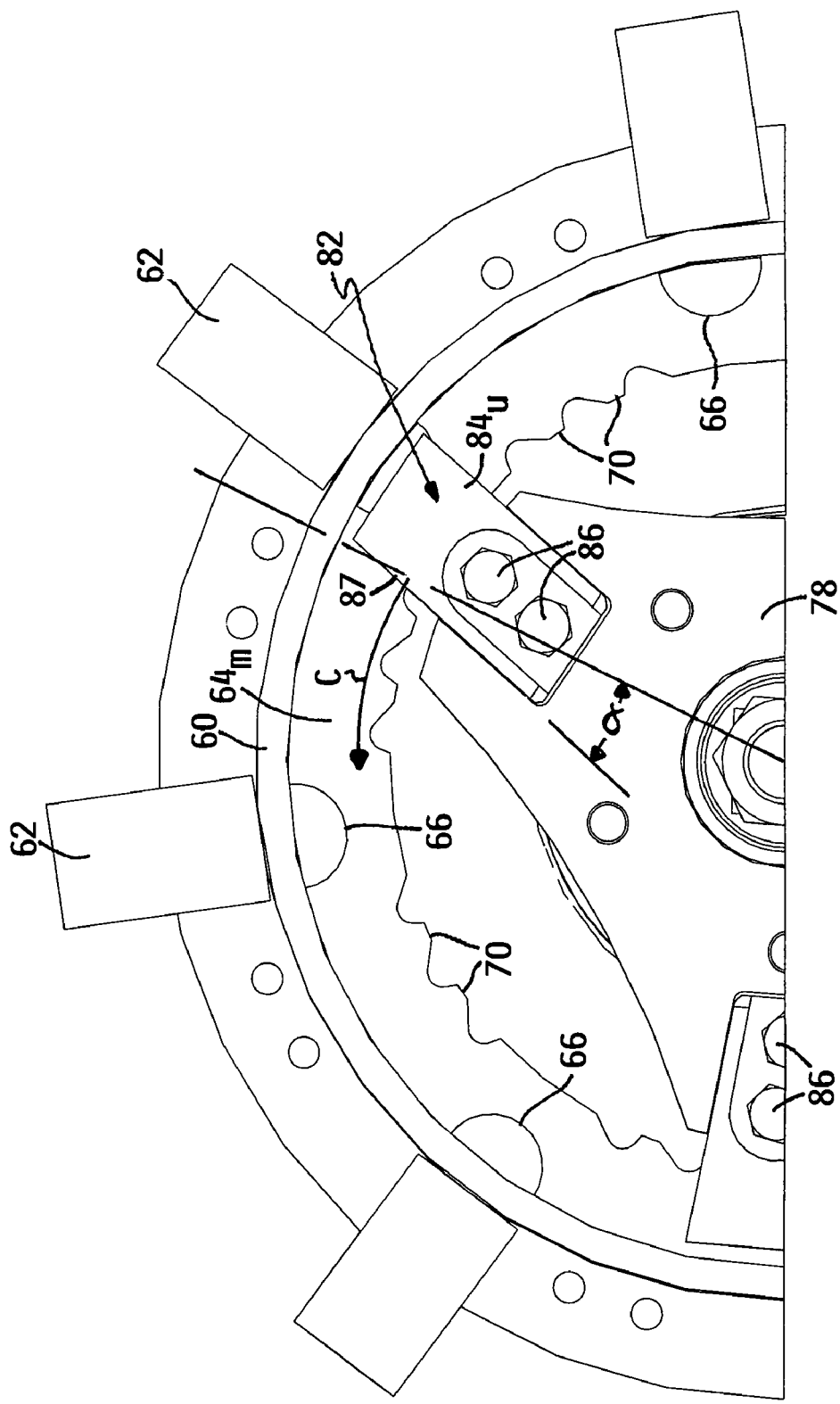
FIG. 17 is a downward looking, horizontal cross-sectional view through the distributor of FIG. 11 taken immediately beneath the top ring of the distributor, particularly illustrating the rearward rake angle on the blades carried on the chopper.

To make up for the amount of cross-sectional area lost to the presence of middle ring $64_m$, the outer circumference of middle ring $64_m$ has a semicircular notch 66 adjacent the entrance to each port 58. Notch 66 has a diameter along its base approximately equal to the diameter of port 58. Notches 66 are shown most clearly in FIGS. 14, 15 and 17. Thus, with middle ring $64_m$ bisecting each port 58 and with a notch 66 adjacent the entrance to each port 58 as shown in FIGS. 14, 15 and 17, the Applicant has found that the size of the solids that are able to pass past middle ring $64_m$ and enter ports 58 is restricted to solids that are approximately 50% or less in area compared to the cross-sectional area of port 58. Such solids simply have not been found to appreciably plug in any of the pipes 62 or hoses 48.

As previously noted, if middle ring $64_m$ restricts the size of the solids entering ports 58, then some solids are excluded from entering and remain inside housing 56. Distributor 46 of this invention includes means for chopping these solids into smaller pieces. This chopping means includes the action of the three rings 64 together along with the action of a rotary chopper 68.

So far the description has focused on the port restriction caused by middle ring $64_m$, but one must not forget the other two rings $64_b$ and $64_t$ contained inside housing 56. Bottom ring $64_b$ is located adjacent the bottom of housing 56 below the circular array of ports 58. Top ring $64_t$ is located adjacent the top of housing 56 above the circular array of ports 58. Like middle ring $64_m$, the top and bottom rings $64_t$ and $64_b$ are also fixed and are stationary in housing 56 by virtue of being welded to the inside diameter of housing side wall 60. Top ring $64_t$, middle ring $64_m$, and bottom ring $64_b$ are parallel to but vertically spaced from one another.

Figure 16:
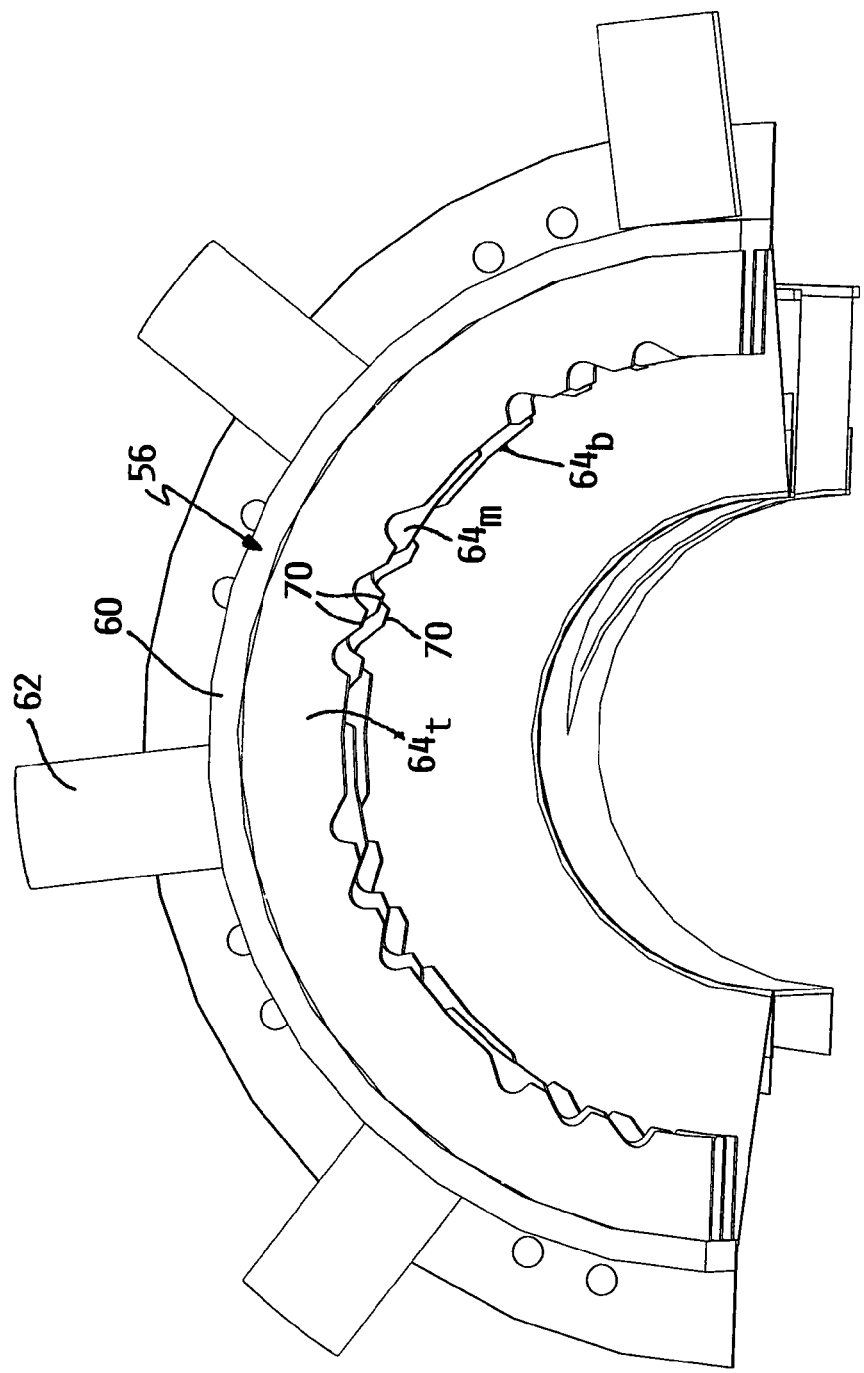
FIG. 16 is a downward looking, horizontal cross-sectional view through the distributor of FIG. 11 taken immediately beneath the top wall of the distributor and with the chopper of the distributor removed for clarity, particularly illustrating all three rings and the relative staggering of the teeth carried on the rings.

Looking at FIGS. 15 and 16, the inner diameter of rings 64 have groups of serrations or teeth 70 located circumferentially therearound between adjacent ports 58 in housing side wall 60. Teeth 70 help break up or chop the solids in the liquid manure suspension into smaller pieces. The sides of teeth 70 need not be sharpened but can be blunt. As shown most clearly in FIG. 16, teeth 70 in middle ring $64_m$ are preferably circumferentially offset or staggered slightly relative to teeth 70 in the top and bottom rings $64_t$ and $64_b$. In other words, teeth 70 in the top and bottom rings $64_t$ and $64_b$ overlie one another, but teeth 70 in middle ring $64_m$ will be rotated slightly relative to teeth 70 in the top and bottom rings so as to be circumferentially offset from teeth 70 in the top and bottom rings $64_t$ and $64_b$.

Figure 18:
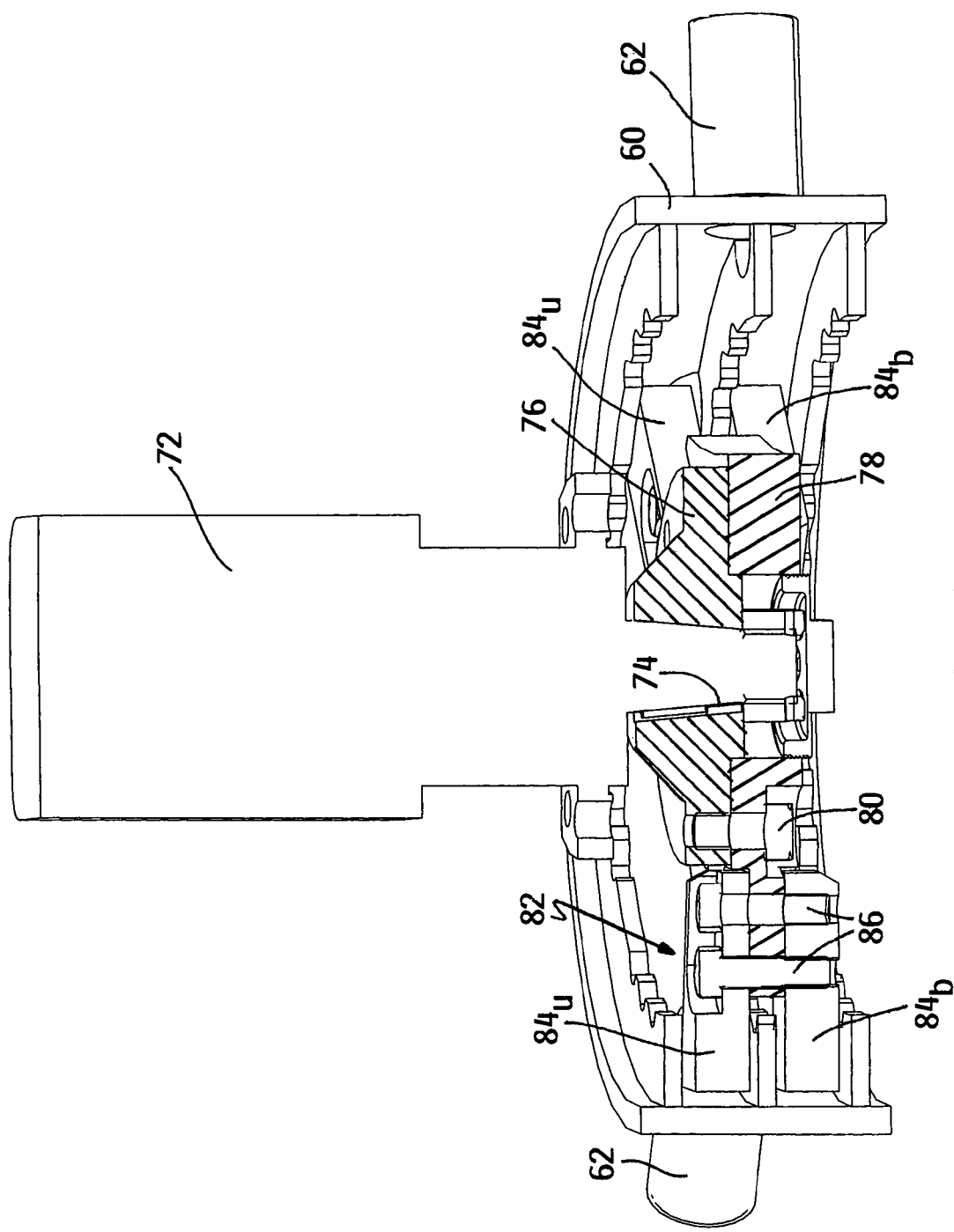
FIG. 18 is a vertical cross-sectional view through the distributor of FIG. 11 but with much of the structure of the distributor removed for clarity, particularly illustrating the structure of the chopper.

Referring now to FIGS. 17 and 18, a rotary chopper 68 is carried inside housing 56. Chopper 68 is powered by an external motor 72 carried on the top of housing 56. Motor 72 is a hydraulic motor but could comprise an electric motor or any other suitable motor. Motor 72 has a drive shaft 74 connected to a drive hub 76 contained inside housing 56.

A triple lobed chopper disc 78 is carried inside housing 56 close to the level of middle ring $64_m$. As shown in FIG. 17, the lobes of chopper disc 78 do not completely fill in the open central interiors of rings 64, but large portions of the central interiors of rings 64 remain open. This permits the liquid manure to flow upwardly past chopper disc 78 to the upper portion of housing 56, namely to the volume between middle ring $64_m$ and top ring $64_t$. Chopper disc 78 is bolted to drive hub 76 of motor 72 by a plurality of disc attachment bolts 80. See FIG. 18.

Each lobe of chopper disc 78 carries an outwardly extending chopper blade 82. Since there are desirably three lobes on chopper disc 78, there will also be three chopper blades 82, though the number of lobes and the number of blades could obviously vary. Each chopper blade 82 is forked with an upper blade bit $84_u$ overlying middle ring $64_m$ and a lower blade bit $84_b$ underlying middle ring $64_m$. Blade bits 84 are themselves bolted to the outer periphery of chopper disc 78 using a plurality of blade attachment bolts 86. Each of the upper and lower blade bits 84 has a height that substantially fills in the gap or distance between middle ring 64$_m$ and either the top or bottom ring 64$_t$ or 64$_b$, respectively.

Preferably, motor 72 rotates at approximately 500 rpm. With three chopper blades 82 on chopper disc 78, this means that a chopper blade 82 passes a fixed point along the inner diameter of side wall 60 of housing 56, such as the entrance to each port 58, approximately 1,500 times in one minute or about 25 times per second.

In FIG. 17, the direction of rotation of chopper 68 is illustrated by the arrow C. Blade 82 formed by the upper and lower blade bits 84 has a leading edge 86 taken with respect to the direction of rotation of chopper 68. Desirably, leading edge 87 is rearwardly inclined at a rearward rake angle indicated as α in FIG. 17 measured relative to a radial line. Rake angle α is approximately 12.5°. Thus, as blade 82 reaches and rotates past port 68 feeding pipe 62, the base of leading edge 86 gets there slightly in advance of the tip of leading edge 86. This helps prevent jamming a larger solid that might be obstructing port 68 into port 68 and tends to sweep such a solid on around in housing 56 to further decrease the size of the solid. Rake angle α also helps promote a pumping action by blades 82 inside housing 56.

Turning now to the operation of chopper 68, if the liquid manure suspension contains solids that are bigger than the size that can get past middle ring 64$_m$ into ports 58, these solids will remain inside housing 56 and will be circulated around by chopper 68. As each blade 82 encounters such solids, blade 82 will push the solids ahead of it against the teeth 70 contained on the inner diameters of rings 64. This will tend to grind or cut away at the solids thus reducing their size. In addition, blade 82 may sometimes simply sever the solids in half by virtue of the shearing action of each blade 82 relative to the solids. This shearing action is also enhanced by the rearward rake angle α of blades 82. In any event and regardless of how the solids get reduced in size, the action of chopper 68 and the presence of rings 64 inside housing 56 with their teeth 70 will eventually reduce the solids to a size that is small enough for them to enter into a distributor port 58 and escape housing 56 with the rest of the liquid manure suspension.

The Distribution Tools

Turning now to the rest of applicator 2, the rear of trailer 4 carries a tool frame or bar 88, or a plurality of tool frames or bars 88, that mount a plurality of individual distribution tools 50. Tools 50 are laterally spaced apart and set side-by-side across the length of tool bars 88. Tool bars 88 are capable of being raised up off the ground to lift tools 50 out of contact with the ground and the side tool bars 88 can also be folded up along the sides of trailer 4. When in use, all tool bars 88 are lowered and are aligned end-to-end until the individual tools 50 are placed in contact with the ground.

Figure 8:
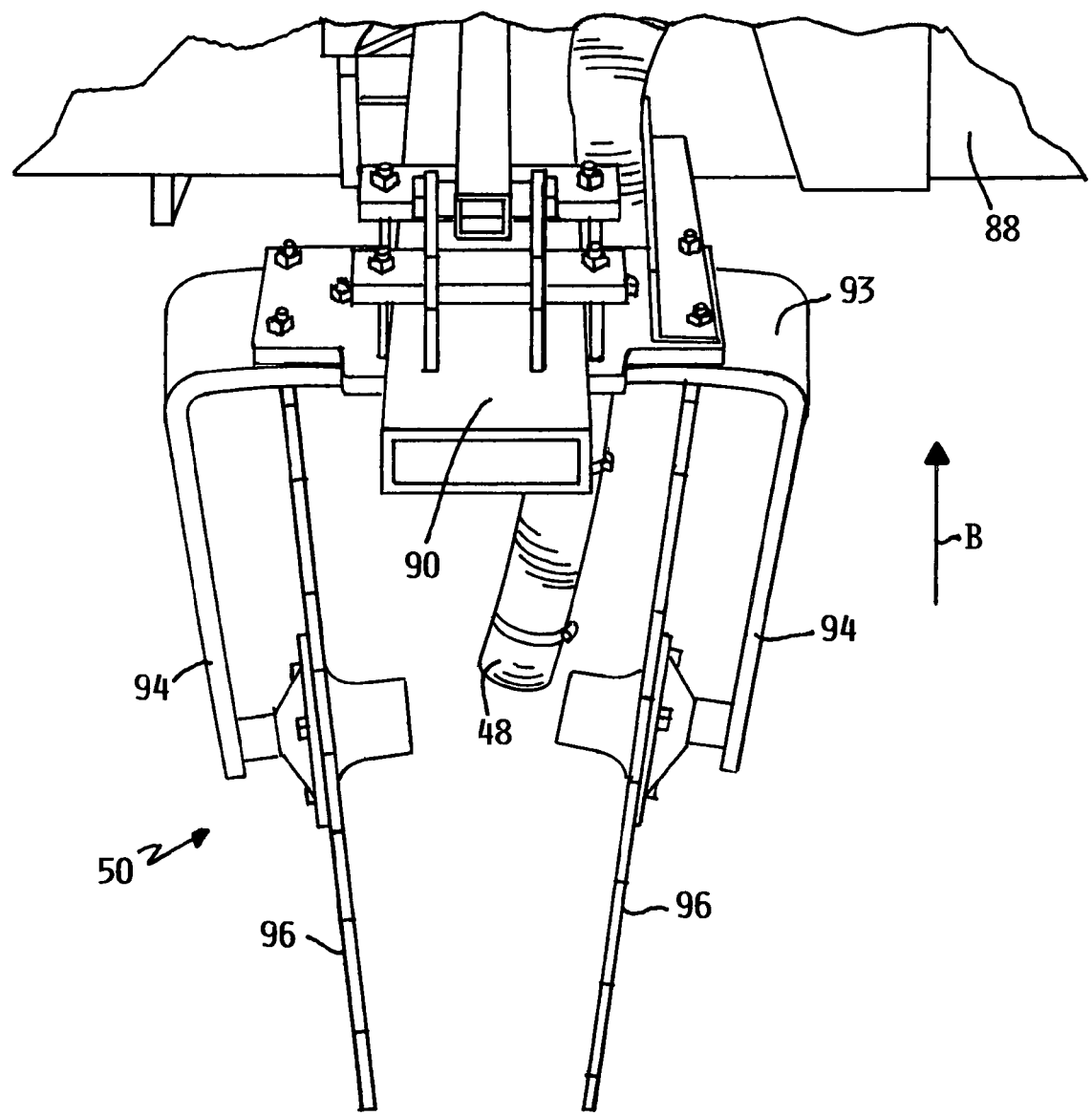
FIG. 8 is a rear perspective view of one of the tools carried on a tool bar, particularly illustrating the outlet end of one hose located between a pair of rotary coulters and the toed in, angled orientation of the coulters.
Figure 9:
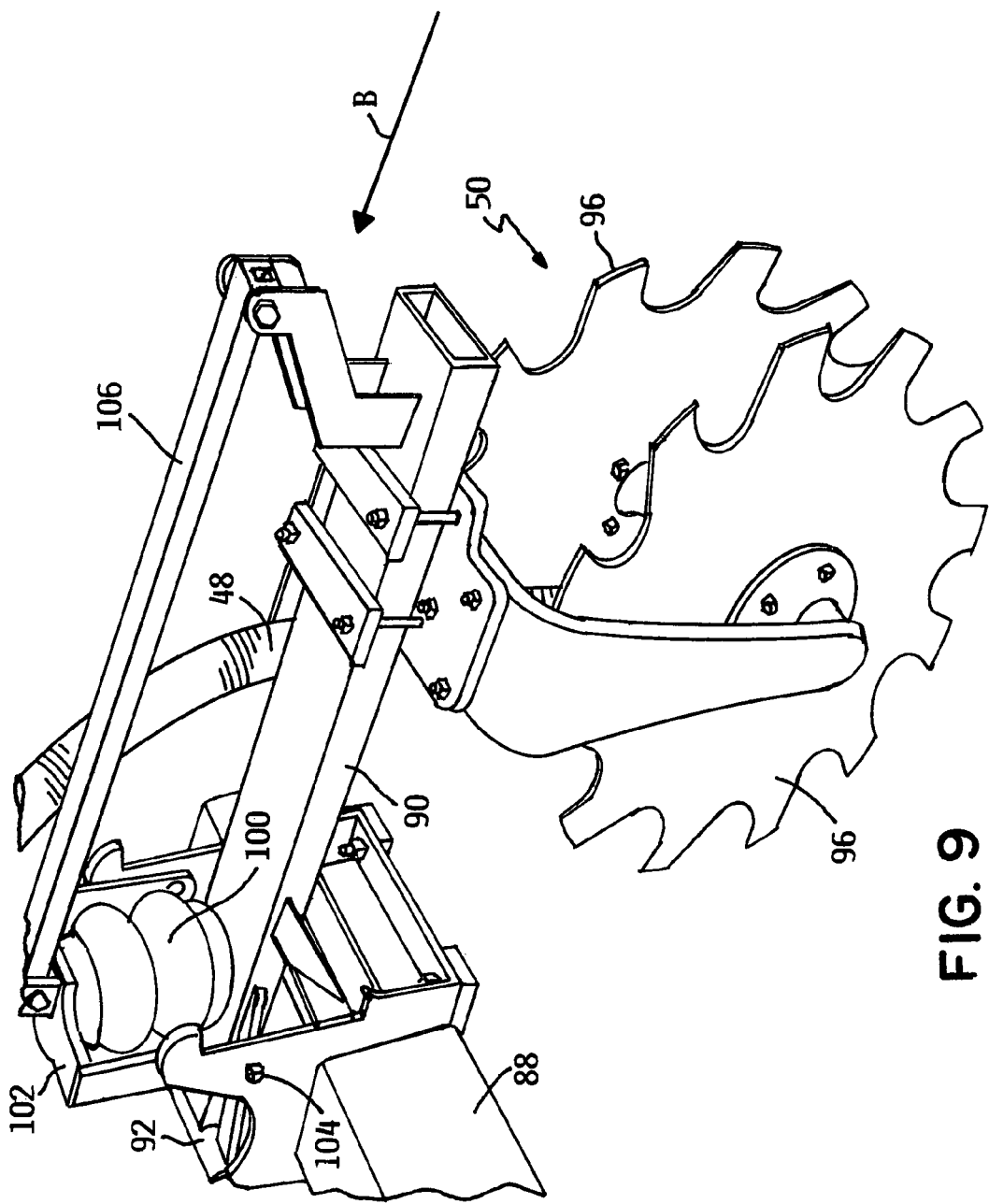
FIG. 9 is a side perspective view of one of the tools, particularly illustrating the tool in a substantially horizontal operational position relative to the tool bar corresponding to the situation where the coulters and trailer are traversing relatively flat ground.
Figure 10:
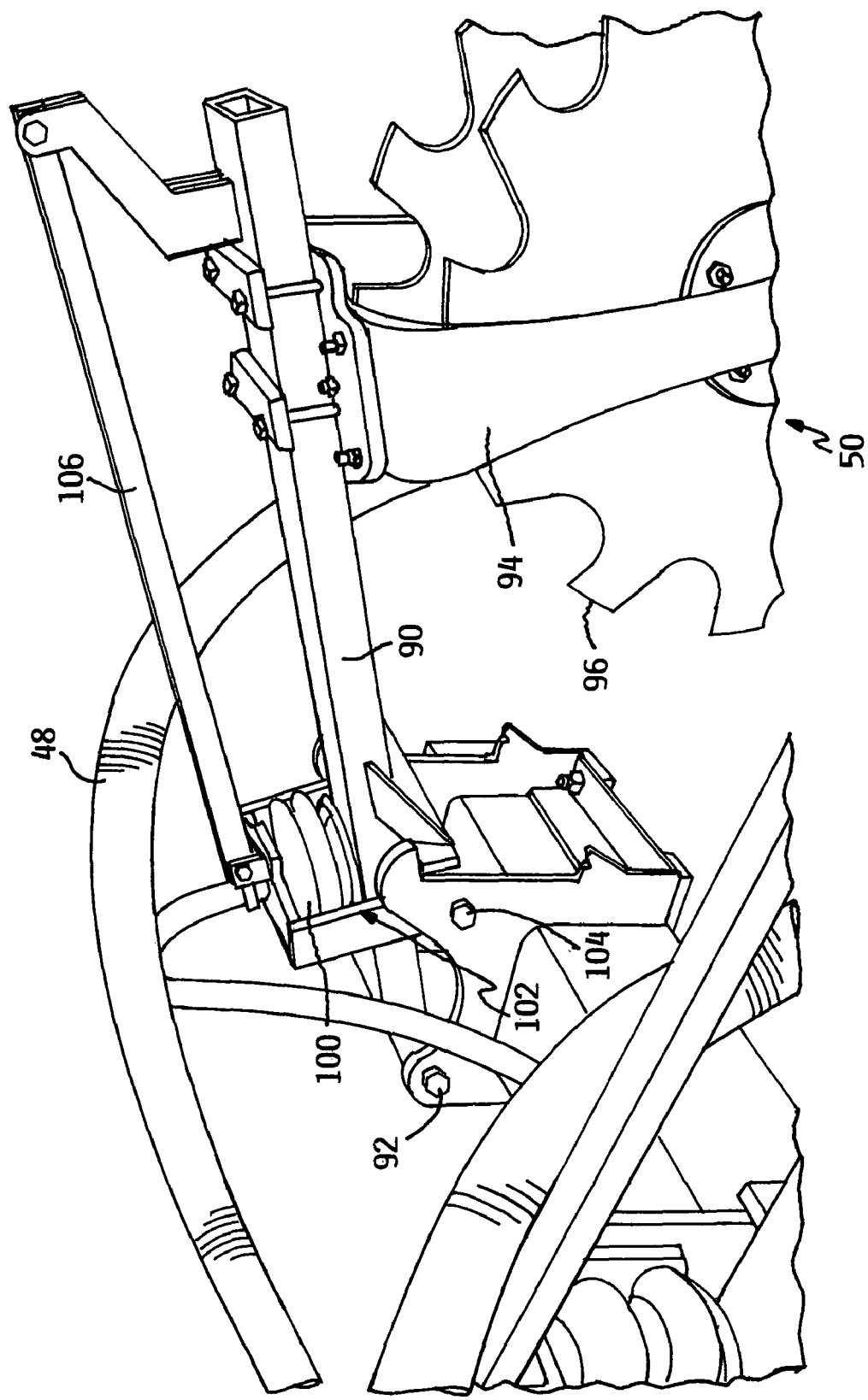
FIG. 10 is a side perspective view similar to FIG. 9, but particularly illustrating the tool in a rotated position relative to the tool bar as would occur when the tool accommodates itself to a rolling ground contour which causes the tool to pitch relative to the tool bar.

Referring now to FIGS. 8-10, one tool 50 is shown therein. A description of one tool 50 will suffice to describe the other tools 50 as tools 50 are identical to one another.

Tool 50 comprises a rearwardly extending tool arm 90 that pivots relative to tool bar 88 about a rear pivot pin 92. See FIGS. 9 and 10. The underside of arm 90 carries a yoke 93 with downwardly extending legs 94. See FIG. 8.

A toothed coulter 96 is rotatably journalled on each leg 94 of the yoke. As shown in FIG. 8, the lower ends of legs 94 are inclined inwardly towards one another as they extend downwardly so that the bottom half of each coulter 96 is toed inwardly relative to the top half of each coulter. In addition, legs 94 are also canted inwardly towards one another as they extend rearwardly so the rear half of each coulter 96 toes inwardly relative to the front half of each coulter 96. Thus, each coulter 96 is toed or canted relative to both a vertical longitudinal plane as well as a vertical transverse plane with the coulters being wider apart at the front and top than at the rear and bottom. The bottom open end of one hose 48 is fixed to tool 50 to empty onto the ground between coulters 96 ahead of the pivot axes of coulters 96 taken with respect to a forward direction of movement of applicator 2 as indicated by the arrow B in FIGS. 8 and 9.

It is desirable that some downforce be provided on arm 90 of tool 50 to keep coulters 96 in contact with the ground. This is provided by an expandable air bag or bellows 100 as described in the Applicant's published patent application No. 2006/0065412 which was earlier incorporated by reference herein. The reader hereof may refer to this earlier application for more detail regarding the operation of bellows 100.

Bellows 100 as used in applicator 2 is small enough to overlie arm 90 of tool 50. The bottom of bellows 100 bears against the top of arm 90 of tool 50 with the top of arm 90 forming a first support surface for bellows 100. The top of bellows 100 bears against the underside of the top of an overlying bellows yoke 102 with the underside of the top of yoke 102 forming a second support surface for bellows 100. As air is forced into bellows 100 causing bellows 100 to expand, the force is transmitted to the top of arm 90 to provide a desired downforce on tool 50 since the top of bellows 100 cannot move up as it is constrained against yoke 102.

In tools 50 of this invention, yoke 102 is also pivotally carried on tool bar 88 and pivots about a horizontal pivot pin 104 that is set forwardly of the rear pivot pin 92 on which arm 90 itself pivots. The top of yoke 102 is coupled by a pivotal connecting link 106 to the front of arm 90. Thus, if tool 50 encounters uneven or sloping ground contours and tool 50 rises and falls relative to tool bar 88 as coulters 96 roll on the ground, yoke 102 will rise or fall in concert with tool 50. Thus, the top of yoke 102 always remains parallel to the top of arm 90. This prevents bellows 100 from expanding along one side while compressing along an opposite side if, for example, arm 90 were to pivot upwardly. Now, as shown in FIG. 10, if arm 50 pivots upwardly, the front and rear sides of bellows 100 are both compressed evenly together due to the pivoting action of yoke 102. This leads to increased reliability and life for bellows 100.

The system for applying downforce to arm 90 as described immediately above, namely bellows 100 and pivotal yoke 102, could be used on zone tillage tools as well as manure applicators. For example, a conventional spring bubble coulter having a wavy or fluted circumference (not shown) could be rotatably mounted or carried in some fashion on arm 90 in place of or in addition to hose 48. Such a tillage coulter would extend down into the soil for a few inches, e.g. two to three inches or so, when coulters 96 roll on the ground with coulters 96 at least partially trailing the tillage coulter to confine and mound the soil atop the zone behind the tillage coulter. This would be an effective tool for zone tillage in the spring when the zones of soil are to be tilled to relatively shallow depths. The downforce applying system described above in which the pivotal yoke 102 helps compress and/or expand both the front and rear sides of bellows 100 evenly as arm 90 pivots up and down would help lead to increased bellows reliability and life in such a zone tillage tool.

The Operation of The Applicator

As tool bar 88 moves forwardly over the ground in the direction of arrow B, liquid manure can be pumped out of tank 12, through transfer pipe 44 and through distributor 46. Such liquid manure will flow down through hoses 48 to empty between and at the front of the pair of rotary coulters 96 in tools 50. Coulters 96 break or fluff up the soil in a plurality of zones corresponding to the numbers of tools 50. The liquid manure is deposited directly into these zones and coulters 96 mix the soil with the liquid manure.

Thus, applicator 2 is effective for fertilizing zones that have been tilled using strip tillage methods. The use of a naturally occurring fertilizer material such as liquid manure provides the economic and environmental advantages noted previously in the Background of the Invention section of this application.

Applicator 2 of this invention permits the application rate for liquid manure to be dramatically lowered. Hoses 48 leading from distributor 46 can now be sized at approximately 2" or even 1.5" instead of the 2.5" to 4" hoses used in prior art equipment. The use of distributor 46 to restrict the solids passing out of distributor 46 to sizes equal to or less than 50% the cross-sectional area of hoses 48 means that hose plugging is largely avoided even with smaller hoses 48. Distributor 46 will simply not pass solids that are too large. In addition, chopper 68 and rings 64 will grind up and chop larger solids into sizes small enough to pass the restriction provided by middle ring $64_m$.

By being able to restrict the application rate for liquid manure, applicator 2 can more effectively apply liquid manure to zones that have been tilled using a zone tillage practice of farming. Only 1,500 gallons of high quality liquid manure is required per acre in a zone tilled field, but prior art distributors will not properly apply liquid manure in amounts less than about 3,000 to 3,500 gallons per acre. With applicator 2 of this invention, the Applicant has been able to apply liquid manure in amounts as low about 900 gallons to the acre without plugging. Thus, liquid manure will not be over applied using applicator 2.

While applicator 2 of this invention is not limited to zone tillage applications but would be useful for applying liquid manure at lower rates to any type of field, it works hand in hand with zone tillage applications. Applicator 2 conserves the quantity of liquid manure that is applied to the field and avoids any of the ill effects that might be obtained from the over application of liquid manure. Applicator 2 of this invention is a significant advance in the field of farming.

Various modifications of this invention will be apparent to those skilled in the art. For example, while a common middle ring $64_m$ is used to serve to restrict the entrances to a plurality of ports 58, each port 58 could have its own separate small restriction flange in front of it. Thus, the scope of the invention is not limited to the details disclosed in this application, but is limited only by the scope of any claims appended to a corresponding utility patent application.

I claim:

1. A liquid manure applicator, which comprises:
   (a) a tank for holding a supply of liquid manure;
   (b) a distributor having a plurality of distribution ports, wherein the distributor is operatively coupled to the tank to receive liquid manure therefrom;
   (c) a plurality of hoses operatively connected to the distribution ports of the distributor with the hoses leading away from the distributor;
   (d) a plurality of distribution tools that support distribution ends of the hoses above a plurality of zones in a farm field to apply liquid manure to the zones as the tools are moved over the zones; and
   (e) a plurality of restriction flanges within the distributor with the restriction flanges bisecting entrances to the distribution ports to restrict or limit the size of any solids suspended in the liquid manure that can enter the distribution ports.

2. The applicator of claim 1, wherein the restriction flanges are sized relative to the entrances to the distribution ports to restrict the size of the solids entering the distribution ports to a size that is substantially equal to or less than 50% of a cross-sectional area of the hoses.

3. The applicator of claim 1, wherein the restriction flanges are notched adjacent the entrances to the distribution ports such that solids can pass into the entrances to the distribution ports on either side of the restriction flanges and through the notches of the restriction flanges.

4. The applicator of claim 1, wherein the distributor includes a cylindrical housing with the distribution ports being circumferentially spaced around the housing, and wherein the restriction flanges are adjacent an inner diameter of the cylindrical housing adjacent the distribution ports.

5. The applicator of claim 4, wherein the restriction flanges are provided by adjacent, circumferential portions of a common ring.

6. The applicator of claim 1, further including a rotary chopper within the distributor that reduces the size of larger solids until the larger sizes have been broken up into pieces small enough to pass the size restriction provided by the restriction flanges.

7. The applicator of claim 6, wherein the restriction flanges are provided by adjacent, circumferential portions of a common ring, and wherein the rotary chopper has at least one blade that sweeps past at least one surface of the ring to grind and break up the larger solids.

8. A liquid manure applicator, which comprises:
   (a) a tank for holding a supply of liquid manure;
   (b) a distributor having a plurality of distribution ports, wherein the distributor is operatively coupled to the tank to receive liquid manure therefrom;
   (c) a plurality of hoses operatively connected to the distribution ports of the distributor with the hoses leading away from the distributor;
   (d) a plurality of distribution tools that support distribution ends of the hoses above a plurality of zones in a farm field to apply liquid manure to the zones as the tools are moved over the zones; and
   (e) a plurality of restriction flanges within the distributor with the restriction flanges passing across entrances to the distribution ports to restrict or limit the size of any solids suspended in the liquid manure that can enter the distribution ports, wherein the restriction flanges are provided by adjacent, circumferential portions of a common ring, wherein the ring has an outer diameter adjacent the entrances to the distribution ports and an inner diameter radially inwardly therefrom; and
   (f) a rotary chopper within the distributor that reduces the size of larger solids until the larger sizes have been broken UP into pieces small enough to pass the size restriction provided by the restriction flanges, wherein the rotary chopper has at least one blade that sweeps past at least one surface of the ring to grind and break UP the larger solids, and wherein the inner diameter of the ring is toothed or serrated to assist in grinding and breaking up the larger solids as the blade of the rotary chopper sweeps over the inner diameter of the ring.

9. The applicator of claim 1, wherein the tank includes an inlet on a top of the tank into which liquid manure may enter the tank, and further including:
   (a) a screened filter across the inlet to screen the liquid manure passing into the inlet of the tank; and
   (b) a powered actuator carried on the tank for moving the filter from an operative position in which it filters the inlet to the tank to a cleaning position in which the filter has been moved off the inlet to the tank and is exposed to one side of the tank such that the filter can be cleaned and hosed off by an operator standing on the ground.

10. The applicator of claim 9, wherein the filter is in the shape of a three-dimensional basket with an open top, wherein the basket nests within the inlet to the tank when the filter is in the operative position thereof.

11. The applicator of claim 10, wherein the basket comprises a front wall, a rear wall, a bottom wall, and a pair of trapezoidal side walls.

12. The applicator of claim 1, wherein each distribution tool supports at least one hose thereon, and wherein each distribution tool comprises a pivotal arm that is supported for rolling over the ground by at least one rotatable ground engaging member carried on the pivotal arm.

13. The applicator of claim 12, wherein a pair of rotary coulters are carried on the pivotal arm to form the ground engaging members, and wherein the hose is located on the pivotal arm to discharge the liquid manure between the rotary coulters.

14. The applicator of claim 13, further including an expandable bellows carried atop the arm for applying downforce to the arm, wherein the bellows is supported between the arm and an upper support that is pivotally connected to a frame of the tool with the upper support pivoting in concert with the arm to remain parallel to the arm.

15. A method for applying liquid manure to a farm field that has a plurality of laterally spaced, parallel zones in which crops will be planted, which comprises:
   (a) providing a supply of liquid manure which includes suspended solids therein;
   (b) providing a distributor which comprises:
      (i) a plurality of walls that collectively define an interior cavity for receiving the liquid manure;
      (ii) a plurality of distribution ports placed in at least one of the walls for allowing the liquid manure to flow out of the cavity through the distribution ports;
      (iii) a plurality of external distribution pipes associated with the distribution ports for receiving the liquid manure exiting through the distribution ports; and
      (iv) a plurality of distribution hoses connected to the external distribution pipes; and
      pumping the liquid manure into the interior cavity, through the distribution ports of the distributor, through the distribution pipes, and through the plurality of distribution hoses that lead from the distribution pipes;
   (c) arranging distribution ends of the distribution hoses over the tilled zones such that the liquid manure is discharged atop the tilled zones; and
   (d) restricting the size of the suspended solids that may pass from the distributor to the distribution hoses to a size that is substantially equal to or less than 50% of a cross-sectional area of the hoses, wherein the size restriction of this step takes place within the interior cavity of the distributor upstream from the distribution ports before the liquid manure enters the distribution pipes and distribution hoses.

16. The method of claim 15, further including the step of chopping up the suspended solids located within the interior cavity of the distributor until the suspended solids are reduced in size enough to be able to pass the size restriction of step (d).

17. A tool used in zone tillage farming in which a plurality of laterally spaced, parallel zones are provided in which row crops are planted, which comprises:
   (a) a tool frame;
   (b) a pivotal arm connected to the tool frame for pivoting about a first pivot axis, wherein the arm carries at least one rotatable ground engaging member for rolling on the ground with the arm pivoting upwardly and downwardly in response to changes in ground contour;
   (c) a device mounted on the arm for performing an agricultural operation in one of the zones in the farm field;
   (d) an expandable bellows for putting a downforce on the arm that increases or decreases as air pressure inside the bellows is increased or decreased, wherein the bellows is sandwiched and constrained between a pair of support surfaces with a first support surface being fixed to the arm and; and
   (e) a pivotal connecting link having one end pivotally connected to the second support surface and an opposite end pivotally connected to the arm such that pivoting motion of the arm also acts through the connecting link to pivot the second support surface such that the second support surface remains substantially parallel to the first support surface to avoid uneven motion of opposite sides of the bellows as the arm pivots on the tool frame to follow ground contours.

18. The tool of claim 17, wherein the agricultural operation performing device is a hose for applying liquid manure atop the zone.

19. The tool of claim 17, wherein the agricultural operation performing device is a zone tillage coulter.

20. A liquid manure applicator, which comprises:
   (a) a tank for holding a supply of liquid manure, wherein the tank includes:
      (i) an inlet on a top of the tank into which liquid manure may enter the tank;
      (ii) a screened filter across the inlet to screen the liquid manure passing into the inlet of the tank; and
      (iii) a powered actuator carried on the tank for moving the filter from an operative position in which it filters the inlet to the tank to a cleaning position in which the filter has been moved off the inlet to the tank and is exposed to one side of the tank such that the filter can be cleaned and hosed off by an operator standing on the ground;
   (b) a distributor having a plurality of distribution ports, wherein the distributor is operatively coupled to the tank to receive liquid manure therefrom;
   (c) a plurality of hoses operatively connected to the distribution ports of the distributor with the hoses leading away from the distributor; and
   (d) a plurality of distribution tools that support distribution ends of the hoses above a plurality of zones in a farm field to apply liquid manure to the zones as the tools are moved over the zones.

* * * * *